US012695849B2

(12) United States Patent
Sykes et al.

(10) Patent No.: US 12,695,849 B2
(45) Date of Patent: Jul. 28, 2026

(54) REDUCING LATENCY IN HEAD-MOUNTED DISPLAY FOR THE REMOTE OPERATION OF MACHINERY

(71) Applicant: Altec Industries, Inc., Birmingham, AL (US)

(72) Inventors: Jonathan Westin Sykes, Gower, MO (US); Timothy J. Mourlam, Shawnee, KS (US)

(73) Assignee: Altec Industries, Inc., Birmingham, AL (US)

( * ) Notice: Subject to any disclaimer, the term of this patent is extended or adjusted under 35 U.S.C. 154(b) by 7 days.

(21) Appl. No.: 18/643,767

(22) Filed: Apr. 23, 2024

(65) Prior Publication Data

US 2024/0275925 A1     Aug. 15, 2024

Related U.S. Application Data

(63) Continuation of application No. 18/225,326, filed on Jul. 24, 2023, now Pat. No. 11,997,429.

(Continued)

(51) Int. Cl.
*H04N 7/18* (2006.01)
*B25J 9/16* (2006.01)
(Continued)

(52) U.S. Cl.
CPC ............ *H04N 7/183* (2013.01); *B25J 9/1689* (2013.01); *B25J 9/1697* (2013.01); *B25J 13/06* (2013.01);
(Continued)

(58) Field of Classification Search
None
See application file for complete search history.

(56) References Cited

U.S. PATENT DOCUMENTS

| | | | |
|---|---|---|---|
| 1,676,584 | A | 7/1928 | Tideman |
| 1,966,989 | A | 7/1934 | Bernard |

(Continued)

FOREIGN PATENT DOCUMENTS

| | | |
|---|---|---|
| CN | 110978004 A | 4/2020 |
| CN | 113001569 A | 6/2021 |

(Continued)

OTHER PUBLICATIONS

U.S. Appl. No. 18/135,941 Non-Final Office Action issued Aug. 16, 2024.

(Continued)

*Primary Examiner* — Talha M Nawaz
(74) *Attorney, Agent, or Firm* — Erise IP, P.A.

(57) ABSTRACT

Media, systems, and methods for reducing latency in a head-mounted display for the remote operation of machinery. A remote camera sends raw video to a graphics processing unit which processes the video and transmits the updated video to a head-mounted display with limited latency such that the control of remote devices may be improved. The image may be spherically rendered and projected onto the head-mounted display with a rectangular view. The graphics processing unit may determine a rotation matrix based on a pose of the remote camera and a pose of the head-mounted display, and the image may be projected based on the rotation matrix.

20 Claims, 10 Drawing Sheets

Related U.S. Application Data

(60) Provisional application No. 63/392,927, filed on Jul. 28, 2022.

(51) Int. Cl.

| | |
|---|---|
| *B25J 13/06* | (2006.01) |
| *G05B 19/4155* | (2006.01) |
| *G06F 3/01* | (2006.01) |
| *G06T 3/12* | (2024.01) |
| *G06T 3/4015* | (2024.01) |
| *H04N 23/661* | (2023.01) |
| *H04N 23/695* | (2023.01) |
| *H04N 7/22* | (2006.01) |

(52) U.S. Cl.
CPC ......... *G05B 19/4155* (2013.01); *G06F 3/012* (2013.01); *G06T 3/12* (2024.01); *G06T 3/4015* (2013.01); *H04N 23/661* (2023.01); *H04N 23/695* (2013.01); *G05B 2219/50391* (2013.01); *H04N 7/22* (2013.01)

(56) References Cited

U.S. PATENT DOCUMENTS

| | | | |
|---|---|---|---|
| 2,786,092 | A | 3/1957 | Gage |
| 4,937,759 | A | 6/1990 | Vold |
| 5,538,207 | A | 7/1996 | O'Connell et al. |
| 5,640,876 | A | 6/1997 | Erwin |
| 5,782,440 | A | 7/1998 | Ozga et al. |
| 6,527,405 | B2 | 3/2003 | Hsieh |
| 6,837,671 | B2 | 1/2005 | Devine et al. |
| 9,038,989 | B2 | 5/2015 | Devine et al. |
| 9,203,219 | B2 | 12/2015 | Devine et al. |
| 9,707,680 | B1 | 7/2017 | Jules et al. |
| 9,727,053 | B2 | 8/2017 | Ito |
| 10,626,632 | B2 | 4/2020 | Sauber et al. |
| 10,658,822 | B2 | 5/2020 | Devine et al. |
| 10,908,228 | B1 | 2/2021 | Gorghuber |
| 11,087,540 | B2 * | 8/2021 | Ernst .................. G02B 27/0172 |
| 11,660,750 | B1 | 5/2023 | Sykes et al. |
| 11,689,008 | B1 | 6/2023 | Nichols et al. |
| 11,697,209 | B1 | 7/2023 | Mourlam et al. |
| 11,717,969 | B1 | 8/2023 | Mourlam et al. |
| 11,742,108 | B1 | 8/2023 | Naber et al. |
| 11,749,978 | B1 | 9/2023 | Lindquist et al. |
| 11,794,359 | B1 | 10/2023 | Sykes et al. |
| 11,839,962 | B1 | 12/2023 | Nichols |
| 2001/0055525 | A1 | 12/2001 | Inokuchi et al. |
| 2002/0179559 | A1 | 12/2002 | Hashiguchi et al. |
| 2003/0172598 | A1 | 9/2003 | Greer |
| 2004/0024311 | A1 | 2/2004 | Quaid, III |
| 2004/0182235 | A1 | 9/2004 | Hart |
| 2006/0045294 | A1 | 3/2006 | Smyth |
| 2007/0070072 | A1 * | 3/2007 | Templeman ............ A63F 13/24 345/473 |
| 2007/0192910 | A1 | 8/2007 | Vu et al. |
| 2007/0291128 | A1 | 12/2007 | Wang et al. |
| 2008/0188986 | A1 | 8/2008 | Hoppe |
| 2011/0256995 | A1 | 10/2011 | Takazakura et al. |
| 2014/0094968 | A1 | 4/2014 | Taylor et al. |
| 2015/0015708 | A1 | 1/2015 | Collett et al. |
| 2015/0044009 | A1 | 2/2015 | Yang et al. |
| 2017/0055883 | A1 | 3/2017 | Lee et al. |
| 2017/0124398 | A1 * | 5/2017 | Birkbeck ............... G06V 20/46 |
| 2017/0334067 | A1 | 11/2017 | Swarup et al. |
| 2017/0340969 | A1 | 11/2017 | Lim et al. |
| 2018/0348861 | A1 * | 12/2018 | Uscinski ............... A63F 13/211 |
| 2019/0076092 | A1 | 3/2019 | Saroha et al. |
| 2019/0124294 | A1 * | 4/2019 | Ahn .................... H04N 23/698 |
| 2019/0125462 | A1 | 5/2019 | Peine et al. |
| 2019/0176334 | A1 | 6/2019 | Zhou et al. |
| 2019/0201136 | A1 | 7/2019 | Shelton, IV et al. |
| 2019/0222004 | A1 | 7/2019 | Turnbull |
| 2019/0256335 | A1 | 8/2019 | Araki |
| 2019/0321971 | A1 | 10/2019 | Bosworth et al. |
| 2020/0122321 | A1 | 4/2020 | Khansari Zadeh et al. |
| 2020/0278660 | A1 | 9/2020 | Virk |
| 2021/0001483 | A1 | 1/2021 | Milenkovic |
| 2021/0055744 | A1 | 2/2021 | Wang et al. |
| 2021/0069894 | A1 * | 3/2021 | Rod ........................ G06F 3/012 |
| 2021/0084278 | A1 * | 3/2021 | Harviainen .......... H04N 13/332 |
| 2021/0252714 | A1 | 8/2021 | Hayashi et al. |
| 2021/0269291 | A1 | 9/2021 | Callaghan et al. |
| 2021/0273424 | A1 | 9/2021 | Harvey et al. |
| 2021/0282871 | A1 | 9/2021 | Prior et al. |
| 2021/0305790 | A1 | 9/2021 | O'Connell et al. |
| 2021/0323153 | A1 | 10/2021 | Chestnutt et al. |
| 2021/0370509 | A1 | 12/2021 | Pivac |
| 2022/0032476 | A1 | 2/2022 | Robertson |
| 2022/0123534 | A1 | 4/2022 | Kwon |
| 2022/0134569 | A1 | 5/2022 | You et al. |
| 2022/0138612 | A1 | 5/2022 | Vengertsev et al. |
| 2022/0203562 | A1 | 6/2022 | Brown et al. |
| 2022/0212340 | A1 | 7/2022 | Hasegawa et al. |
| 2022/0266449 | A1 | 8/2022 | Hasegawa et al. |
| 2022/0383531 | A1 | 12/2022 | Santini et al. |
| 2023/0311296 | A1 | 10/2023 | Murray |
| 2023/0399136 | A1 | 12/2023 | Budu et al. |
| 2024/0012238 | A1 * | 1/2024 | Lin ........................ G06T 7/246 |
| 2024/0033916 | A1 | 2/2024 | Sykes et al. |
| 2024/0033925 | A1 | 2/2024 | Mourlam et al. |
| 2024/0033928 | A1 | 2/2024 | Mourlam et al. |
| 2024/0038413 | A1 | 2/2024 | Naber et al. |
| 2024/0039254 | A1 | 2/2024 | Lindquist et al. |
| 2024/0058935 | A1 | 2/2024 | Nichols |
| 2024/0061632 | A1 | 2/2024 | Kobayashi et al. |
| 2024/0208066 | A1 * | 6/2024 | Sykes ................... B25J 9/1689 |
| 2025/0131588 | A1 * | 4/2025 | Takemoto ............... G06T 7/593 |

FOREIGN PATENT DOCUMENTS

| | | |
|---|---|---|
| CN | 113902990 A | 1/2022 |
| JP | 6840052 | 3/2021 |
| WO | 2020203793 A1 | 10/2020 |

OTHER PUBLICATIONS

U.S. Appl. No. 18/197,438 Notice of Allowance issued Aug. 5, 2024.

U.S. Appl. No. 18/224,278 Non-Final Office Action issued Sep. 5, 2024.

U.S. Appl. No. 18/212,415 Non-Final Office Action issued Apr. 2, 2025.

U.S. Appl. No. 17/875,674, filed Jul. 28, 2022, Jonathan Westin Sykes.

U.S. Appl. No. 17/875,796, filed Jul. 28, 2022, Robert Nichols.

U.S. Appl. No. 17/875,821, filed Jul. 28, 2022, William Naber.

U.S. Appl. No. 17/875,990, filed Jul. 28, 2022, David F. Lindquist.

PCT Patent Application PCT/US2023/028564 International Search Report and Written Opinion of the International Searching Authority, issued Nov. 22, 2023.

U.S. Appl. No. 18/368,155 Non-Final Office Action issued Jun. 21, 2024.

U.S. Appl. No. 18/385,545 Notice of Allowance issued Jul. 15, 2024.

U.S. Appl. No. 18/914,695 Non-Final Office Action issued Oct. 24, 2025.

U.S. Appl. No. 18/222,759, Non-Final Office Action issued Nov. 26, 2025.

U.S. Appl. No. 18/199,570 Non-Final Office Action issued Nov. 3, 2025.

U.S. Appl. No. 19/038,997, Non-Final Office Action issued Feb. 26, 2026.

* cited by examiner

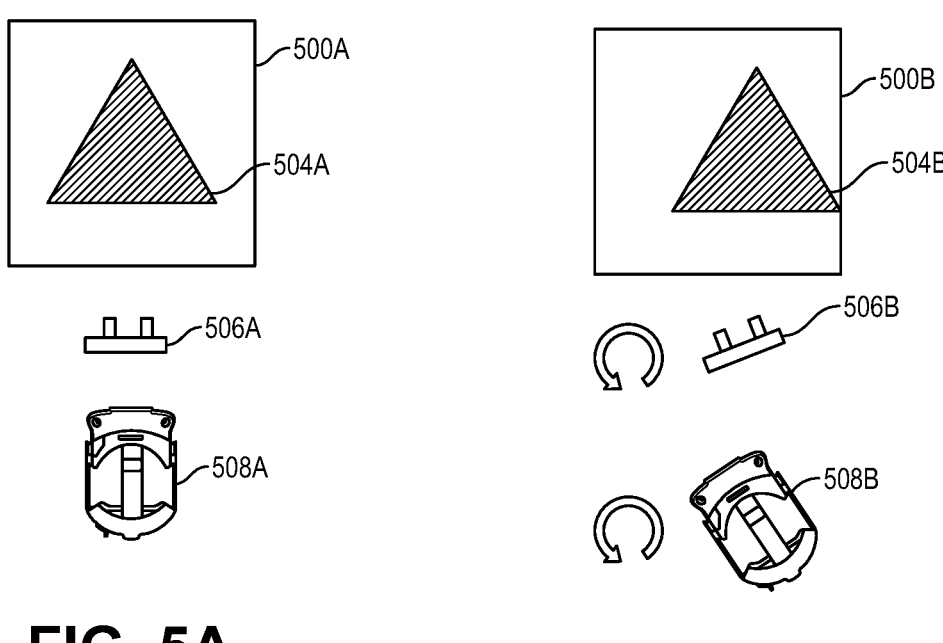
FIG. 5A
FIG. 5B
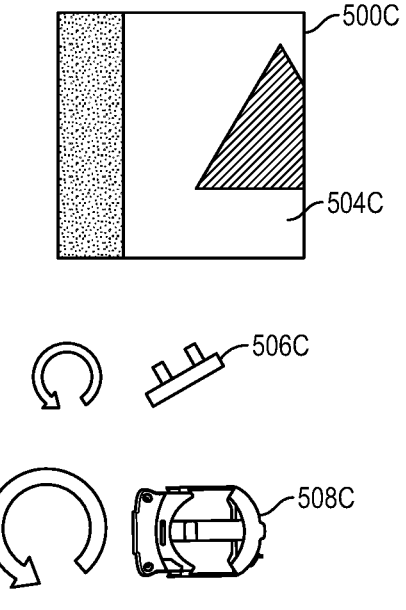
FIG. 5C

702       700

704

702       700

704

702       700

704

702       700

704

REDUCING LATENCY IN HEAD-MOUNTED DISPLAY FOR THE REMOTE OPERATION OF MACHINERY

CROSS-REFERENCE TO RELATED APPLICATIONS

This patent application is a continuation application claiming priority benefit, with regard to all common subject matter, of U.S. patent application Ser. No. 18/225,326, filed Jul. 24, 2023, and entitled "REDUCING LATENCY IN HEAD-MOUNTED DISPLAY FOR THE REMOTE OPERATION OF MACHINERY" ("the '326 application"). The '326 application is a non-provisional patent application claiming prior benefit, with regard to all subject matter, of U.S. Provisional Patent Application No. 63/392,927, filed Jul. 28, 2022, and entitled "REDUCING LATENCY IN HEAD-MOUNTED DISPLAY FOR THE REMOTE OPERATION OF MACHINERY." The identified earlier-filed patent applications are hereby incorporated by reference in their entirety.

BACKGROUND

1. Field

The present disclosure pertains to reducing latency for the remote operation of machinery. More specifically, the present disclosure pertains to reducing latency for a head-mounted display for remotely operating machinery.

2. Related Art

The remote operation of machinery is particularly useful in hazardous environments, such as work in the vicinity of energized power lines or in other locations where it would be difficult or risky for a human to work. A challenge associated with the remote operation of machinery is that a user does not have the same viewing perspective as they would during traditional work. Thus, it is difficult for a user to operate machinery remotely without the appropriate view associated with the machinery in a remote location.

Further, providing a user with the same viewing perspective may introduce latency. This latency may be particularly dangerous and unwanted in hazardous situations requiring precise controls. Additionally, latency may be disorienting to users when operating machinery via a head-mounted display.

SUMMARY

Embodiments of the present disclosure solve the above-mentioned problems. In some embodiments, the present disclosure provides media, systems, and/or methods for providing latency-reduced real-time video associated with a remote location using a remote capture device and a head-mounted display. Video may be captured via one or more cameras mounted on a controllable machine. The captured video may be transferred to a graphics processing unit along with information pertaining to the location of one or more cameras and the location of the headset. In some embodiments, all video processing is done on the graphics processing unit to minimize the latency of the video as displayed in a head-mounted display. In further embodiments, the video may be processed to minimize any latency between the position of the camera and the position of the head-mounted display.

In some embodiments, the techniques described herein relate to one or more non-transitory computer-readable media storing computer-executable instructions that, when executed by at least one processor, perform a method for reducing latency for video captured in a remote location and displayed in a head-mounted display, the method including: receiving, from at least one camera located in the remote location, an image of the remote location, wherein the at least one camera is controlled by a robot located in the remote location; receiving a head-mounted display pose for the head-mounted display, wherein a first movement of the head-mounted display controls a second movement of the robot; transmitting the image to a graphics processing unit associated with the head-mounted display; and by the graphics processing unit: determining a robot pose for the robot; determining, based on the robot pose and the head-mounted display pose, a rotation matrix; and spherically rendering, based on the rotation matrix, the image onto the head-mounted display.

In some embodiments, the techniques described herein relate to one or more non-transitory computer-readable media, wherein determining the robot pose includes: determining a position of the at least one camera when the image was captured by interpolating between a first robot pose and a second robot pose for the robot, wherein the first robot pose is received before the image and the second robot pose is received after receiving the image.

In some embodiments, the techniques described herein relate to one or more non-transitory computer-readable media, wherein determining the robot pose includes: determining a position of the at least one camera when the image was captured by extrapolating between at least two prior robot poses received before receiving the image.

In some embodiments, the techniques described herein relate to one or more non-transitory computer-readable media, wherein the image is received in a RAW image format.

In some embodiments, the techniques described herein relate to one or more non-transitory computer-readable media, wherein the graphics processing unit executes further instructions for demosaicing the image; and converting the image from a fisheye image into an equirectangular image;

In some embodiments, the techniques described herein relate to one or more non-transitory computer-readable media, wherein demosaicing the image and converting the image from the fisheye image to the equirectangular image are performed responsive to the image being received.

In some embodiments, the techniques described herein relate to one or more non-transitory computer-readable media, wherein the image, the robot pose, and the head-mounted display pose are received asynchronously.

In some embodiments, the techniques described herein relate to a system for viewing a remote location, including a remote assembly located in the remote location, the remote assembly including at least one camera configured to capture video of the remote location; and a robot configured to control movement of the at least one camera; a head-mounted display, wherein movement of the head-mounted display causes a corresponding movement in the robot; and a graphics processing unit associated with the head-mounted display, the graphics processing unit configured to execute computer-executable instructions for a render cycle, the computer-executable instructions including receiving a head-mounted display pose of the head-mounted display; determining a rotation matrix based on a robot pose of the robot and the head-mounted display pose; and rendering a frame of the video on the head-mounted display based on the rotation matrix.

In some embodiments, the techniques described herein relate to a system wherein the frame is received at the graphics processing unit in a raw image format and wherein the graphics processing unit executes additional instructions, including demosaicing the frame; and converting the frame from a fisheye image to an equirectangular image, wherein the equirectangular image is spherically rendered onto the head-mounted display.

In some embodiments, the techniques described herein relate to a system wherein the graphics processing unit and the remote assembly are communicatively coupled via a wireless connection.

In some embodiments, the techniques described herein relate to a system wherein the graphics processing unit and the remote assembly are communicatively coupled via a fiber optic connection.

In some embodiments, the techniques described herein relate to a system wherein the graphics processing unit is further configured to: adjust at least one of a convergence of the frame or a zoom level of the frame.

In some embodiments, the techniques described herein relate to a system wherein rendering the frame includes rendering a view corresponding to a subset of the frame captured by the at least one camera and wherein the graphics processing unit is further configured to: adjust the view of the frame to compensate for a difference between a first rotational position of the head-mounted display and a second rotational position of the at least one camera.

In some embodiments, the techniques described herein relate to a method for rendering imagery of a remote location, the method including receiving an image from a camera disposed in the remote location, the image having a first timestamp, wherein the camera is coupled to a robot assembly disposed in the remote location; determining a robot pose of the robot assembly at the first timestamp based on a plurality of prior robot poses; determining, based on the robot pose and a head-mounted display pose of a head-mounted display, a rotation matrix, wherein a movement of the head-mounted display causes a corresponding movement of the camera via the robot assembly; and rendering, based on the rotation matrix, the image in the head-mounted display.

In some embodiments, the techniques described herein relate to a method wherein determining the robot pose includes extrapolating the robot pose based on at least two prior robot poses.

In some embodiments, the techniques described herein relate to a method wherein determining the robot pose includes interpolating between a first prior robot pose and a second prior robot pose, and wherein the first prior robot pose has a second timestamp preceding the first timestamp and the second prior robot pose has a third timestamp succeeding the first timestamp.

In some embodiments, the techniques described herein relate to a method wherein determining the robot pose, determining the rotation matrix, and rendering the image are performed on a graphics processing unit associated with the head-mounted display.

In some embodiments, the techniques described herein relate to a method, further including: demosaicing, by the graphics processing unit, the image; and distorting, by the graphics processing unit, the image to a rectangular view.

In some embodiments, the techniques described herein relate to a method, further including responsive to a new movement of the head-mounted display, determining a new head-mounted display pose, wherein the new movement of the head-mounted display occurs while the robot assembly is locked from moving; determining a new rotation matrix; and rendering a new image based on the new rotation matrix.

In some embodiments, the techniques described herein relate to a method wherein the new image includes a first portion displaying a default view for a portion of the new image that is not captured by the camera.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 1 schematically depicts a remote assembly and head-mounted display;

Figure 4A:
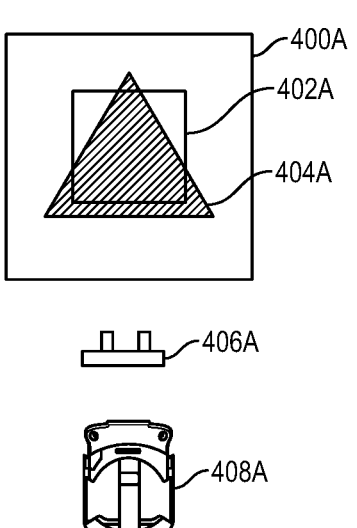
Figure 4B:
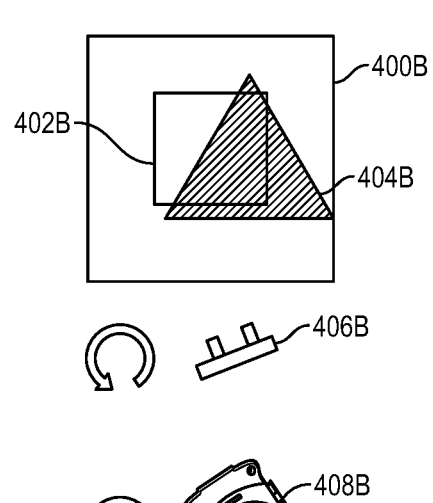
Figure 4C:
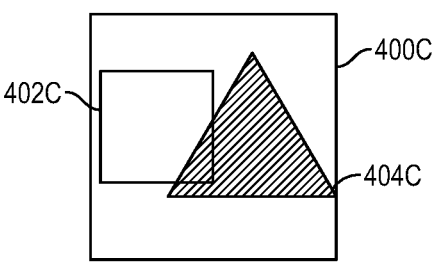
Figure 4D:
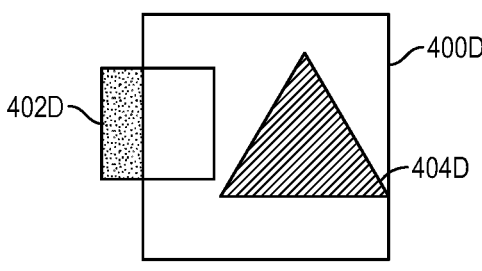
Figure 4D:
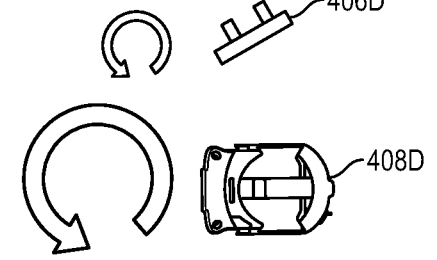
Figure 6A:
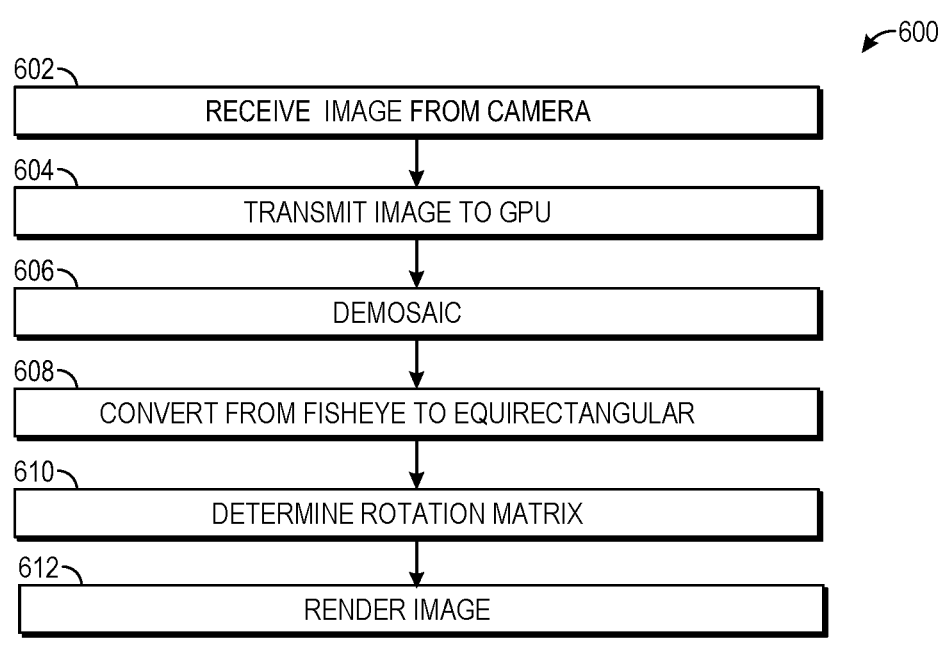
Figure 6B:
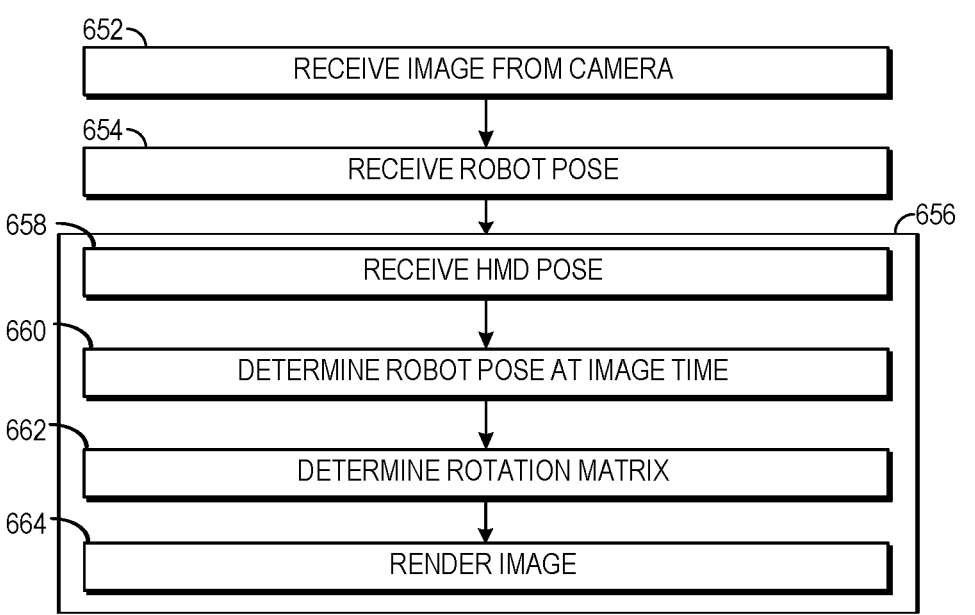
Figure 7A:
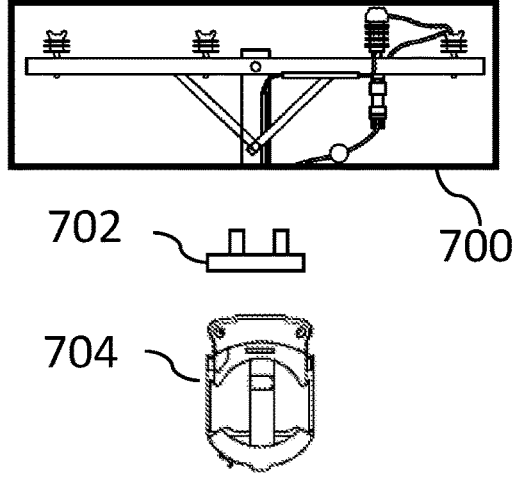
Figure 7A:
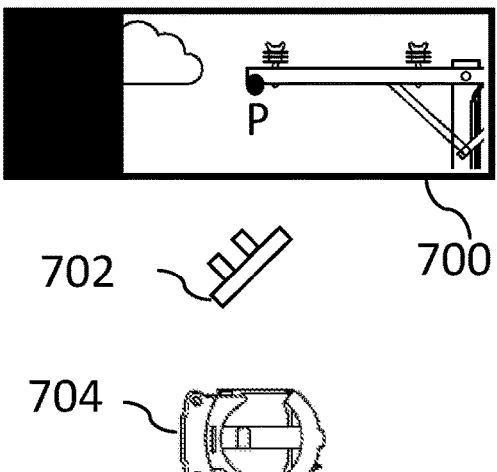
Figure 7B:
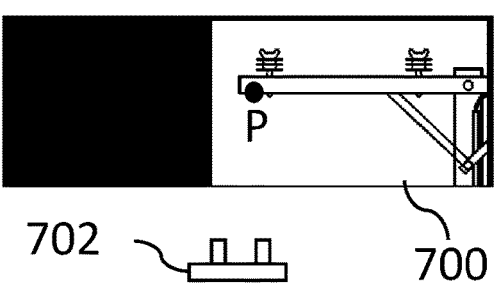
Figure 7C:
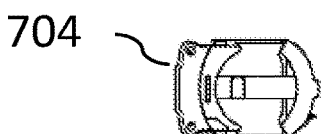
Figure 7D:
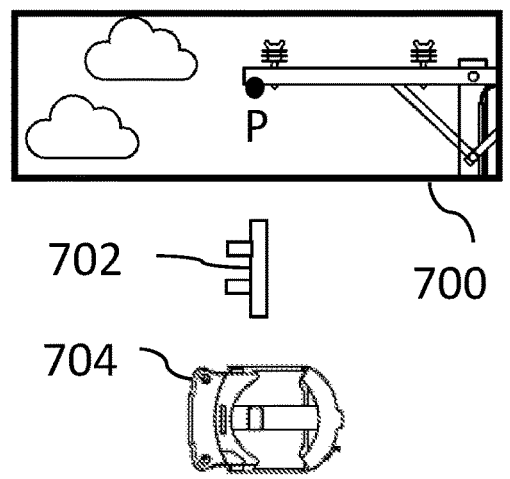
Figure 8:
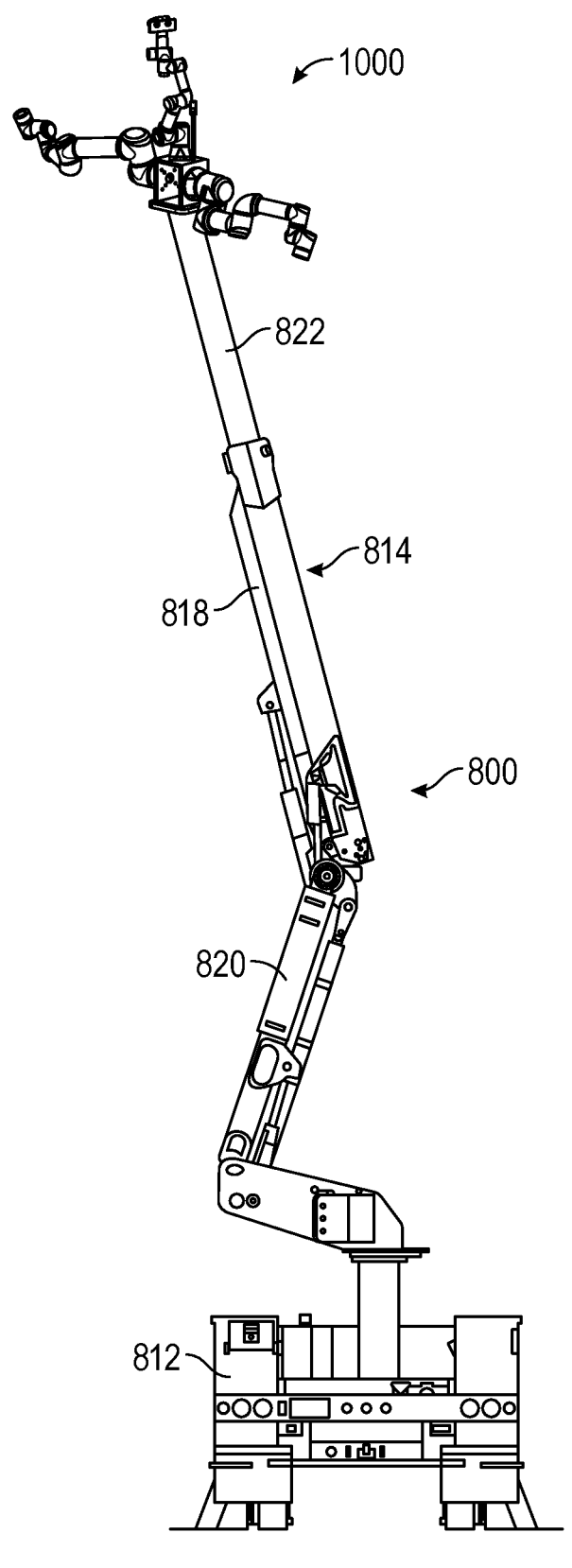
Figure 9:
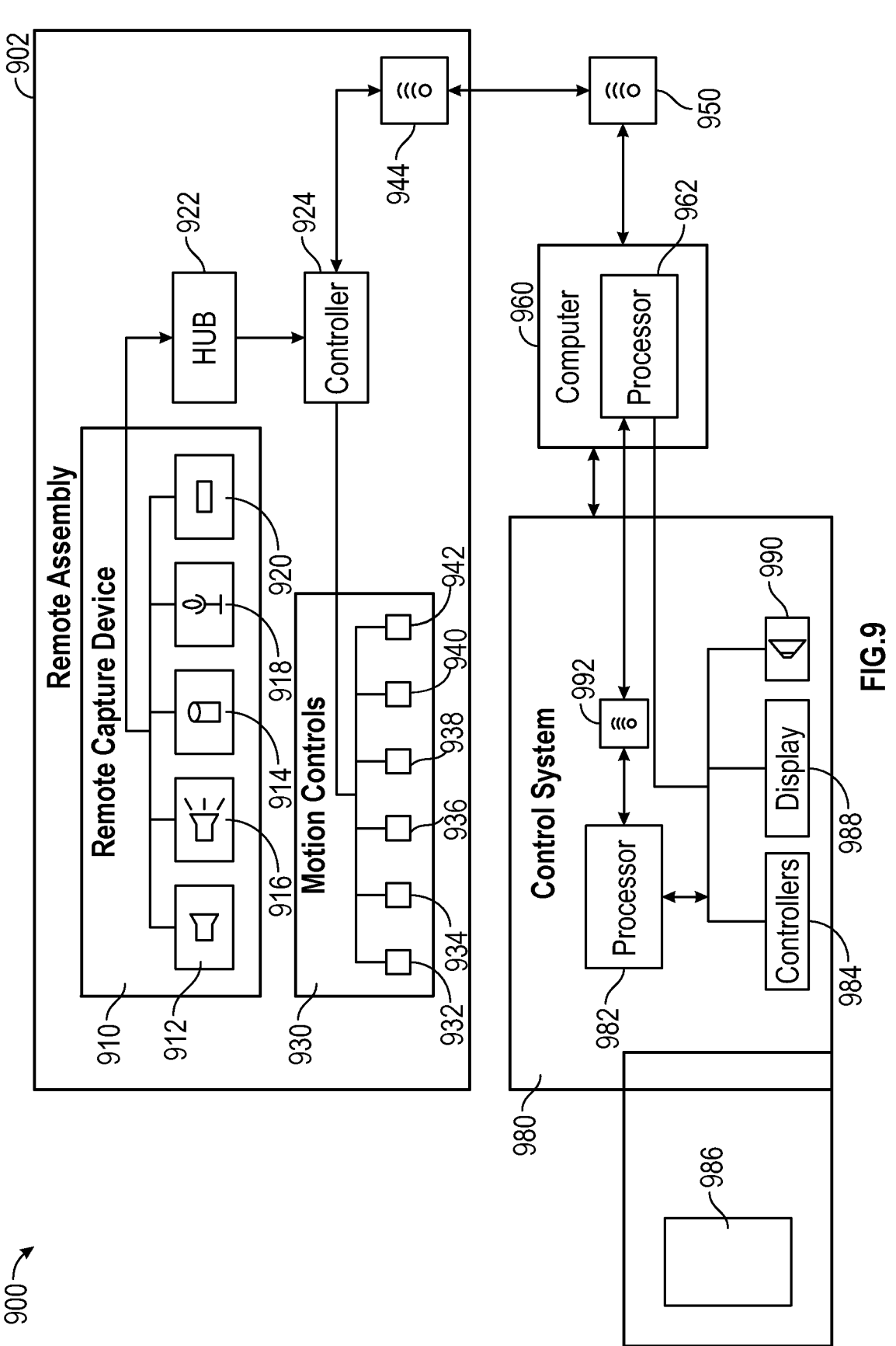
Figure 10:
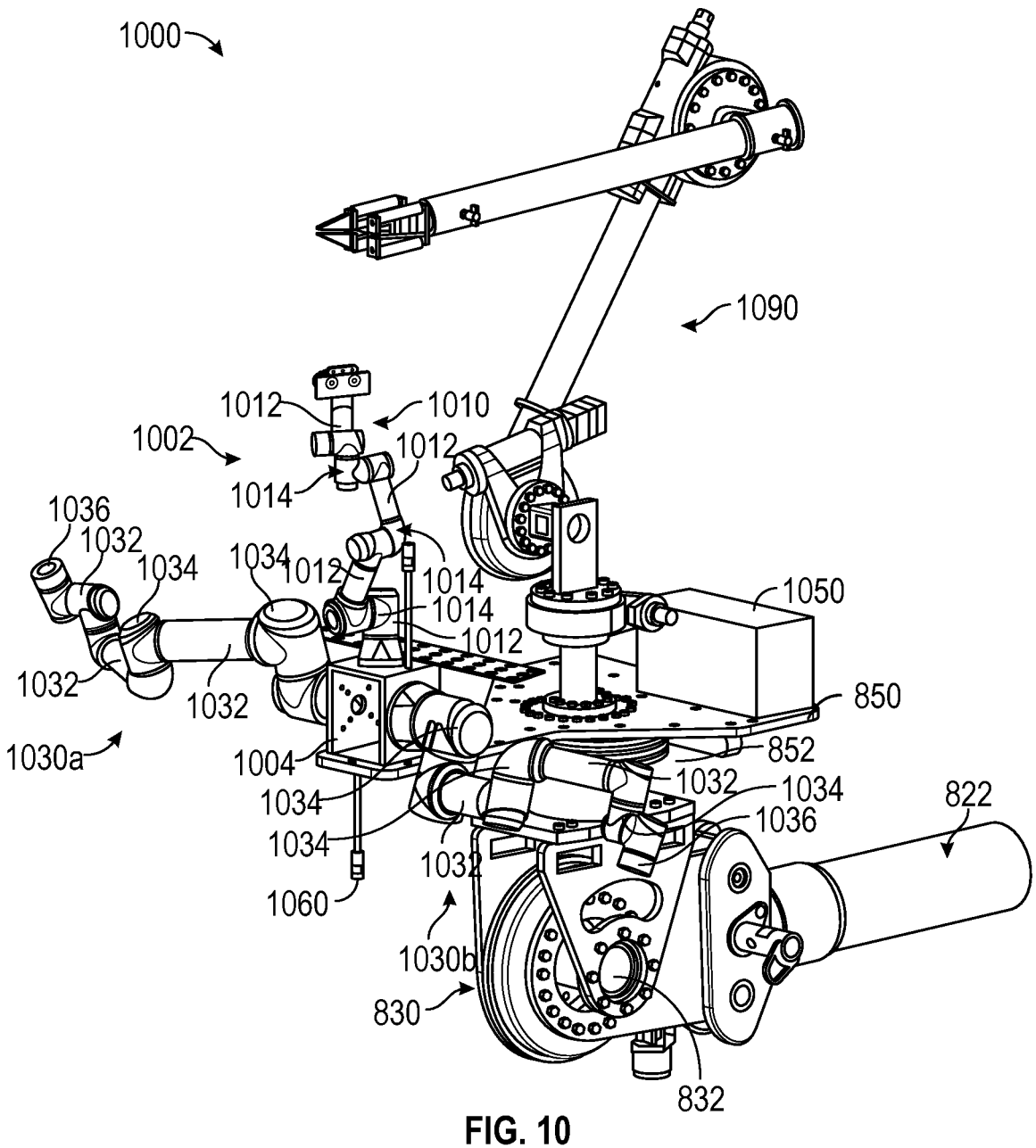
Figure 11:
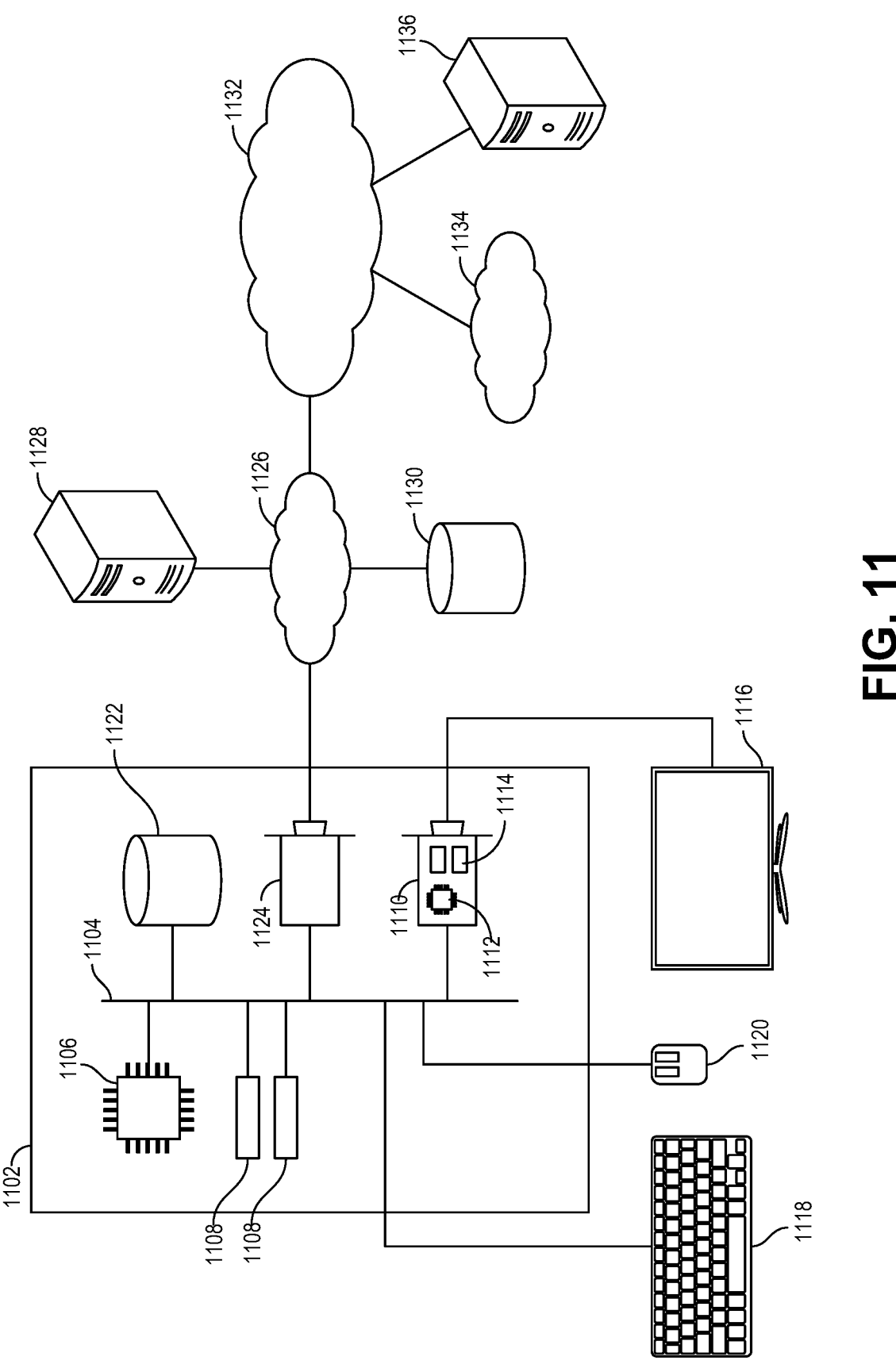

FIG. 4A schematically depicts a view of an object via a headset without the camera or headset turning;

FIG. 4B schematically depicts a view of an object via a headset with the camera turning slightly and the headset turning slightly;

FIG. 4C schematically depicts a view of an object via a headset with the camera turning slightly and the headset exceeding the turning speed of the camera;

FIG. 4D schematically depicts the view of an object via a headset with the camera turning slightly and the headset greatly exceeding the turning speed of the camera;

FIG. 5A schematically depicts the view of an object via a headset without the camera or headset turning;

FIG. 5B schematically depicts a view of an object via a headset with the camera turning slightly and the headset turning slightly;

FIG. 5C schematically depicts a view of an object via a headset with the camera turning slightly and the headset exceeding the turning speed of the camera; and FIG. 6A shows a flow diagram depicting method steps for some embodiments;

FIG. 6B shows a flow diagram depicting method steps for some embodiments;

FIG. 7A schematically depicts the view of an object via a headset without the camera or headset turning;

FIG. 7B schematically depicts the view of an object via the headset when the headset has rotated and the camera is stationary;

FIG. 7C schematically depicts the view of an object via the headset when the headset has rotated and the camera is rotating to match the position of the headset;

FIG. 7D schematically depicts the view of an object via the headset when the headset has rotated and the camera has rotated to match the position of the headset;

FIG. 8 depicts an aerial device relating to some embodiments;

FIG. 9 depicts an exemplary system architecture of a robot unit and manual controls relating to some embodiments;

FIG. 10 depicts a six-degree-of-freedom robot unit relating to some embodiments; and FIG. 11 schematically depicts a hardware platform for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the presently disclosed subject matter can be practiced. The embodiments are intended to describe aspects of the present disclosure in sufficient detail to enable those skilled in the art to practice the presently disclosed subject matter. Other embodiments can be utilized, and changes can be made without departing from the scope of the present disclosure. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

In some embodiments, a system for providing real-time, immersive, sensory information of a remote location is provided. Thus, such embodiments provide a solution to the above-mentioned problems by allowing the user to receive said sensory information. In some embodiments, the sensory information may be provided to the user based on a viewing parameter, such as the viewing angle of the user. The sensory information may be collected using a remote capture device installed in the remote location. The present disclosure provides systems and methods for reducing latency associated with a head-mounted display. The latency may include a processing latency associated with the time to process video frames, such as on a graphics processing unit. For example, a processing latency exists with respect to rendering video frames captured by the camera for display on the head-mounted display worn by the user. Additionally, or in the alternative, the latency may include a camera latency associated with the time to synchronize the mechanical movements of the camera with the movements of the user. For example, when the user moves the orientation of their head to change their visual field, a camera latency exists with respect to a corresponding movement of the camera to orient the camera to the visual field of the user.

Figure 1:
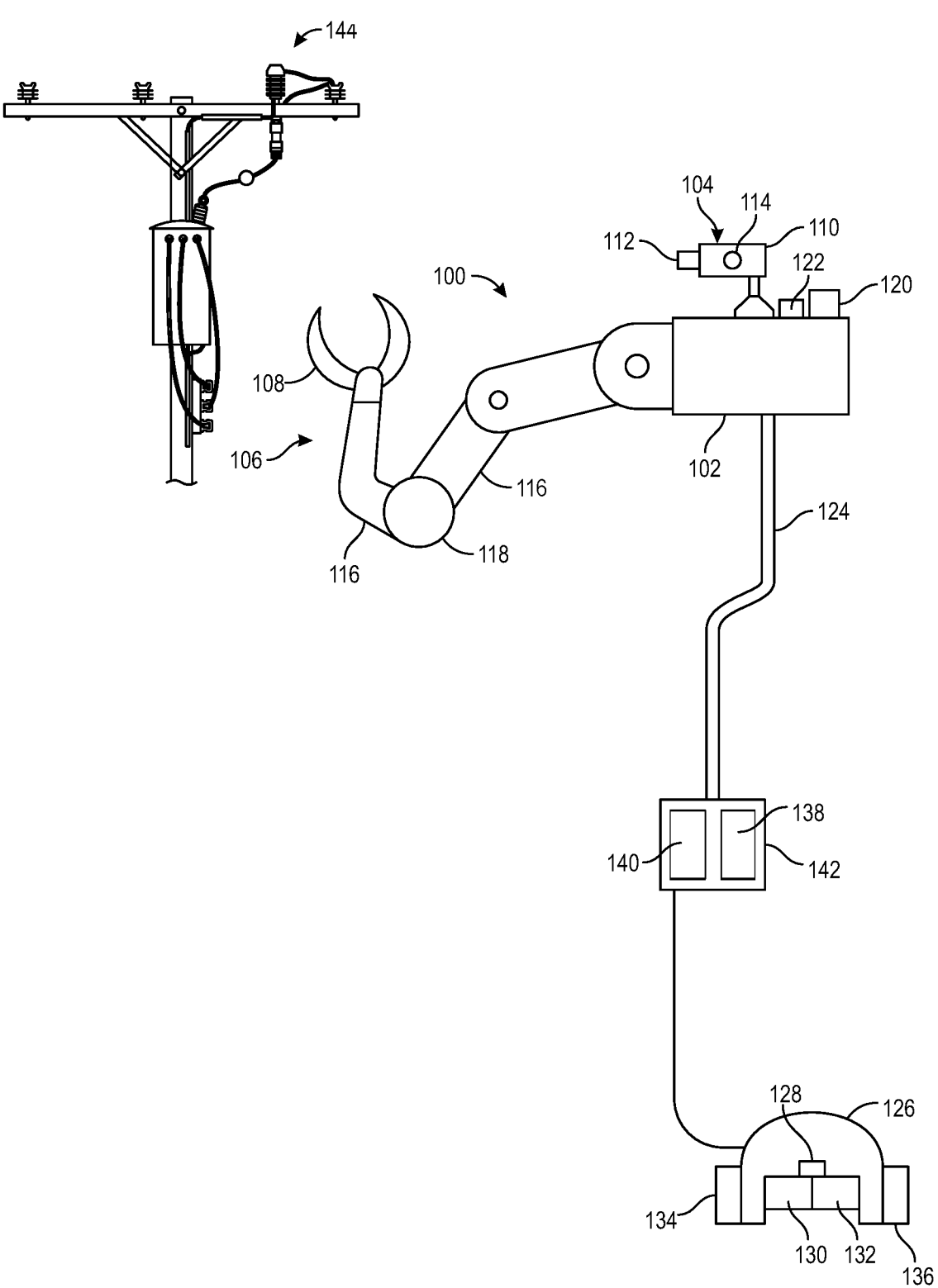

FIG. 1 depicts a remote assembly 100 for some embodiments. Reducing latency is especially important when operating remote assembly 100 on pole-top hardware 144. Pole-top hardware 144 may include power lines and other high voltage or sensitive components which require careful movements, and high latency may lead to accidents or other dangerous scenarios. In some embodiments, the remote assembly 100 comprises frame 102, remote capture device 104, and robotic arm 106. As shown, the remote capture device 104 of some embodiments may comprise a camera mount 110, a plurality of instances of camera 112 disposed on the camera mount 110, and a plurality of microphones 114 disposed on the camera mount 110. The camera mount 110 may include or define a camera manipulator that can change the orientation of one or more of the plurality of instances of camera 112. The robotic arm 106 of some embodiments comprises a plurality of members 116 connected by a respective plurality of instances of pivotable joint 118. In some embodiments, the robotic arm 106 may further comprise a plurality of motors internal to each respective instance of pivotable joint 118 to drive rotation of the pivotable joint 118. The robotic arm 106 may be movable in a plurality of degrees of freedom, such as 1, 2, 3, 4, 5, or 6 degrees of freedom, by actuating the respective motors to move the plurality of members 116. The plurality of members 116 of the robotic arm 106 may include a gimble that has 1, 2, or 3 axes of movement. In some embodiments, the remote assembly 100 further comprises a remote power source 120 and a controller 122. Each of the remote power source 120 and the controller 122 may be secured to frame 102. The remote power source 120 may be used to power the remote capture device 104, and the controller 122 may be used for controlling at least one of the remote capture device 104 and the robotic arm 106. In some embodiments, the robotic arm 106 also receives power from the remote power source 120. Remote power source 120 may be an electric generator, batteries, or any other known power source.

The remote assembly 100 may be attached to another device or exist as a stand-alone device. For example, remote assembly 100 may be attached to a boom of a truck. Further, the applications of the remote assembly 100 are not limited to operations associated with energized power lines. The remote assembly 100 may be used in various other remote locations. For example, in one embodiment, the remote assembly 100 may be in a remote location to monitor the remote location when it would be otherwise difficult for a user to be located at the remote location. Additionally, the remote assembly 100 may be used as a surveillance system such that an operator can observe a monitored location in which the remote assembly 100 is installed.

The robotic arm 106 may comprise at least one instance of tool 108 disposed at the end of the robotic arm 106. The tool 108 may be one of a grapple (as shown), a saw, a drill, an auger, a wire cutter, or any other type of tool, according to the specific application of the respective embodiment. In some embodiments, remote assembly 100 may be positioned in a remote location, such as adjacent to pole-top hardware 144 (for example, an energized power line).

In some embodiments, the remote capture device 104 may be connected to a fiber-optic cable 124. The fiber-optic cable 124 may be disposed between the remote assembly 100 and a head-mounted display 126 to bidirectionally communicate a signal to/from the remote assembly 100. In some embodiments, the fiber-optic cable 124 is desirably included to communicate said signal across a dielectric gap. In some embodiments, it may also be desirable to use the fiber-optic cable 124 based on the data transmission speed of the fiber-optic cable 124. Fiber-optic cables offer an increased data transfer rate, as well as a larger maximum data transfer capability, when compared with traditional electrical forms of data transfer, such as copper cables. Further, in some embodiments, a plurality of instances of fiber-optic cables 124 may be used. For example, a first fiber-optic cable may be used to transmit a signal from the remote assembly 100 to the head-mounted display 126, and a second fiber-optic cable may be used to transmit a signal from the head-mounted display 126 to the remote assembly 100.

The head-mounted display 126 comprises at least one sensor 128 for detecting a viewing angle and/or viewing position of a user, a first visual display 130, a second visual display 132, a first speaker 134, and a second speaker 136. The head-mounted display 126 is configured to be worn by a user on the user's head. In some embodiments, the first visual display 130 and the second visual display 132 may be liquid crystal display (LCD) screens or any other suitable display device to be located in front of the user's eyes like goggles. In some embodiments, the head-mounted display 126 is connected to a central processing unit 138 and a graphics processing unit 140 for processing the signal. Alternatively, the central processing unit 138 and graphics processing unit 140 may be disposed on the head-mounted display 126, on the remote assembly 100, or on a utility vehicle. Further, the central processing unit 138 may be part of a central computer 142. In some embodiments, central computer 142 may be disposed on a utility vehicle or in another remote location. In some embodiments, a plurality of processing elements or processors may be used. It should be understood that central processing unit 138, as described herein, may refer to any of a single processing element (such as a processor) and a plurality of processing elements. Additionally, the plurality of processing elements may be distributed across various locations. For example, in some embodiments, a first processing element may be disposed on the remote assembly 100, a second processing element may be disposed on a utility vehicle, and a third processing element may be disposed within the head-mounted display 126.

In some embodiments, the head-mounted display 126 may only comprise a single visual display that covers the entire viewing area. In such embodiments, it may be desirable to use a single visual display to reduce processing power and/or time. However, in some other embodiments, it is desirable to use both the first visual display 130 and the second visual display 132 to display a stereoscopic virtual representation of the remote location such that the user is able to perceive depth in 3D. Additionally, in some embodiments, a heads-up display (HUD) may be displayed to the user superimposed upon the first visual display 130 and the second visual display 132. In some embodiments, the HUD may overlay a plurality of views. For example, a high-resolution view and a low-resolution view may be overlaid. The high-resolution view may include pole-top hardware 144 and/or one or more objects, such as electrical hardware, that are of interest to the user and/or the remote assembly 100. For example, the high-resolution view may include objects upon which the remote assembly 100 and/or the user are working and/or objects that are in close proximity to a location where the remote assembly 100 and/or the user are working. The low-resolution view may include a background or ancillary region, such as a region that is of ancillary interest and/or that has a sufficient distance away from an object upon which the remote assembly 100 and/or the user is working. In some embodiments, one or more of the presently disclosed latency reduction techniques may be performed upon a subset of the plurality of overlaid views, such as the high-resolution view. Additionally, or in the alternative, in some embodiments, one or more of the presently disclosed latency reduction techniques may be omitted from being performed upon a subset of the plurality of overlaid views, such as the low-resolution view.

The HUD may be a digital and visual representation of additional information. For example, the HUD may include a visual representation of the diagnostic information relating to the robotic arm 106, a utility vehicle, and/or a boom. It should also be understood that the HUD, in some embodiments, includes a visual representation of a timer, a clock, a measured voltage at the boom tip, and/or a warning indication. In some embodiments, additional information may be shared with the user via an audio cue. The audio cue may be a sound played over the first speaker 134 and/or second speaker 136. In some embodiments, the audio cue may be an alarm indicative of an operating condition of the aerial device 10. In some embodiments, for example, an alarm may be played over the first speaker 134 and/or the second speaker 136 to indicate an inadvertent loss of electrical bonding between the remote assembly 100 and an energized power line. In such an example, the electrical bonding may be measured by a sensory device such as a voltmeter. Another exemplary remote assembly is discussed with respect to FIGS. 8-10.

Figure 2:
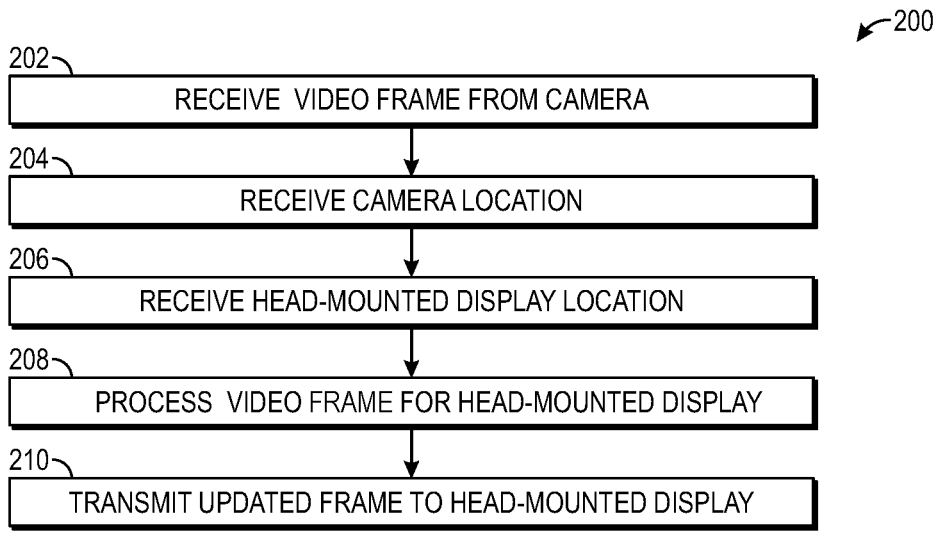
FIG. 2 shows a flow diagram depicting method steps for some embodiments.

FIG. 2 depicts a flow diagram 200, having process steps relating to some embodiments. At step 202, video data may be received from a camera. In some embodiments, the video may be received as a series of frames. In further embodiments, the video may be received in a RAW format. Although examples may be discussed with one camera below, in some embodiments, video data may be received from multiple cameras. For example, two cameras may be used to capture video to simulate a human's eyes. In some embodiments, multiple cameras may switch off sending frames such that the frames of the video are received in an alternating fashion.

Video may be received via an ethernet cable, a fiber optic cable, or any other wired or wireless communication standard. In some embodiments, video from multiple cameras may be received but only processed from a subset of cameras depending on user input. For example, a user may select to process video from a zoomed-in camera while working on a smaller object and then switch to a zoomed-out camera while working on a larger object.

At step 204, a camera location is received. In some embodiments, the camera location may include location and orientation information. Orientation information may include the roll, pitch, and yaw of the camera as well as the camera's location in space. In some embodiments, the camera location may be known based on commands sent to a controller responsible for moving the camera. In further embodiments, the camera location may be additionally used to calibrate the camera location to ensure it is moving properly.

At step 206, a head-mounted display location is received. Like the camera location, the head-mounted display location may include location and orientation information. The head-mounted display may also transmit location not just about the location of the head-mounted display but also related to the velocity, angular velocity, and other metrics related to the movement of the head-mounted display. In some embodiments, the head-mounted display location information may be used to control the movement of the camera as well as a robotic arm attached to the camera. In further embodiments, one or more controllers may also be used to control camera movement.

At step 208, the raw video frame may be processed for display on the head-mounted display. In some embodiments, processing the raw video frame may involve adjusting the distortion level, zoom level, or convergence level. In further embodiments, processing the raw video may involve demosaicing the raw video frame. In still further embodiments, processing the raw video may involve adjusting for a camera latency between the head-mounted display movement and the camera movement. Video processing is discussed further below with respect to FIG. 3.

At step 210, the updated video frame may be transmitted to a head-mounted display. The video frame may be transmitted via an ethernet cable, a fiber optic cable, or any other wired or wireless communication standard. In some embodiments, the head-mounted display may cause the updated video frame to be displayed on a screen in the head-mounted display. In further embodiments, the updated video frame may be displayed on one of two screens in a head-mounted display for a particular eye of a user.

Figure 3:
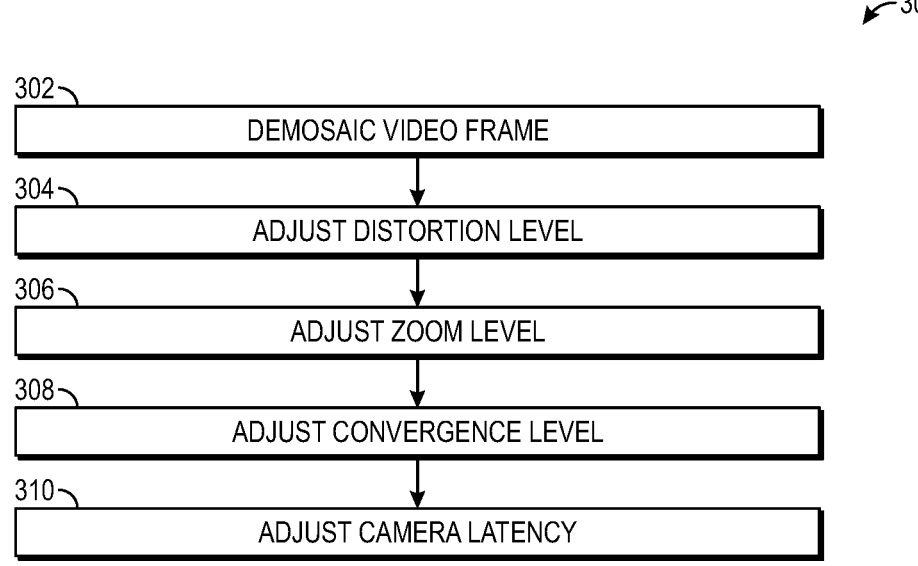
FIG. 3 shows a flow diagram depicting method steps for some embodiments.

FIG. 3 depicts a flow diagram 300, having process steps relating to some embodiments. In some embodiments, flow diagram 300 discloses a method for processing video frames on a graphics processing unit. Processing latency may be lowered by performing all of the steps of flow diagram 300 on the video frame within a graphics processing unit without transferring the video frame out of the graphics processing unit. While FIG. 3 shows steps in sequential order, the steps shown in FIG. 3 may be performed in a different sequential order in various embodiments. Additionally, or in the alternative, one or more steps shown in FIG. 3 may be performed in parallel.

By way of example, at step 302, the raw video frame may be demosaiced. In some embodiments, demosaicing may be used to reconstruct a full-color image from an incomplete color sample output, such as raw video taken from a camera. The raw video may be overlaid with a color filter array to produce a color image consistent with what the camera captured. In some embodiments, the demosaicing algorithm may include the McGuire-Bayer algorithm, bicubic interpolation, spline interpolation, Lanczos resampling, variable number of gradients, pixel grouping, adaptive homogeneity-directed, or AMaZE (Aliasing Minimization and Zipper Elimination). In further embodiments, additional processing may be used to minimize or remove demosaicing artifacts.

At step 304, the distortion levels of the video frame may be adjusted. In some embodiments, the raw video may be taken using a camera that distorts the video. For example, a camera may use a fisheye lens to capture video, which causes distortion around the rim. Such distortion must be adjusted before display such that the image appears normal on the display. In some embodiments, the level of distortion adjustment may vary based on the type of camera used to capture the video. A certain type of lens may be used for a camera to increase or decrease the field of view. For example, a fisheye lens may be used to increase the field of view; however, it may be beneficial to display the video as a rectilinear video.

At step 306, the zoom levels of the video frame may be adjusted. In some embodiments, the frame of the captured video may be different than what is desired to be displayed. In further embodiments, the video may be processed to either zoom in or out prior to display.

At step 308, the convergence levels of the video frame may be adjusted. In some embodiments, multiple cameras may be used, and a video may be displayed to both eyes of a user. Convergence correction may be used to ensure that the video is properly adjusted for the specific eye of the user. In some embodiments, the convergence levels may be adjusted based on if the camera is focusing on something close to the camera or far away from the camera.

In some embodiments, the adjustment of the zoom levels at step 306 may be performed prior to steps 302, 304, and 308. The adjustment of the zoom levels at step 306 may be performed by a vertex shader. Steps 302, 304, and 308 may be performed by a fragment shader. The vertex shader is a graphics processing function of the graphics processing unit that may be used to handle the processing of individual vertices. The fragment shader is a graphics processing function of the graphics processing unit that may be used to process a fragment generated by rasterization into a set of colors and a depth value.

At step 310, the camera latency of the video frame may be adjusted. Camera latency may relate to the difference between the head-mounted display and the camera. In some embodiments, the position of the head-mounted display may control the position of the camera. For example, a user may wear the head-mounted display and turn left to control the camera to turn left. In some embodiments, the head-mounted display may be capable of movement at a higher velocity than the camera. For example, the head-mounted display may be able to be moved ninety degrees right within one second, whereas the camera may take two seconds to move ninety degrees right, thereby introducing a camera latency. In some embodiments, adjusting the camera latency may include modifying the display to account for the difference between the camera view and the head-mounted display view. In some embodiments, adjusting the camera latency may include reducing time attributed to the motion control of the camera manipulator. In further embodiments, the head-mounted display may show an indication that the head-mounted display has exceeded the bounds of the camera view. The camera latency adjustments are discussed further below with respect to FIGS. 4A-D and 5A-C.

FIG. 4A depicts the view 402A of object 404A as displayed in headset 408A. Object 404A may be any visible object. In some embodiments, object 404A may be electrical hardware, such as a power line on a telephone pole. View 402A may be a subset of the captured image 400A as captured by camera 406A. In some embodiments, it may be beneficial to only display a portion of captured image 400A to the user as view 402A. For example, captured image 400A may have a wider focus than is viewable by a human eye and, therefore, display only view 402A, which is the portion of captured image 400A which is actually visible to the user. As depicted, headset 408A and camera 406A are both facing straight ahead. In some embodiments, movement of headset 408A may cause a corresponding movement in camera 406A. For example, moving the headset to look to the left may cause the camera to also move to the left. In some embodiments, view 402A may be centered on captured image 400A.

FIG. 4B depicts view 402B of object 404B as displayed in headset 408B. View 402B may be a subset of the captured image 400B as captured by camera 406B. As depicted, camera 406B and headset 408B have both been slightly rotated to the left. In some embodiments, looking to the left while wearing headset 408B may cause camera 406B to also rotate accordingly. As depicted, camera 406B was able to rotate at the same speed as headset 408B was turned. Because camera 406B and headset 408B rotated at the same speed, view 402B is able to remain in the center of captured image 400B. The resulting effect is that a user wearing headset 408B is able to see view 402B without any camera latency caused by the camera moving.

FIG. 4C depicts the view 402C of object 404C as displayed in headset 408C. View 402C may be a subset of the captured image 400C as captured by camera 406C. As depicted, camera 406C and headset 408C have both been rotated to the left. However, headset 408C has been rotated faster than camera 406C was able to rotate. As a result, displaying the center for captured image 400C could be disorienting to a user wearing headset 408C as the user would expect to see something else based on how quickly the user turned. In some embodiments, adjustments must be performed to account for the difference between where camera 406C is facing and where headset 408C is facing. The adjustment may be based on a difference between a first rotational position of the headset 408C and a second rotational position of 406C, for example. Thus, the view may be shift to match the two rotational positions, as discussed below.

In some embodiments, a difference between where camera 406C is facing and where headset 408C is facing may be compensated by shifting view 402C within captured image 400C. For example, if headset 408C turns to the left faster than camera 406C can turn to the left, view 402C may shift to the left of captured image 400C until camera 406C is able to finish rotating and catch up to the position of headset 408C. In some embodiments, as camera 406C catches up and captured image 400C shifts accordingly, view 402C may return back to the center of captured image 400C.

FIG. 4D depicts the view 402D of object 404D as displayed in headset 408D. View 402D may be a subset of the captured image 400D as captured by camera 406D. As depicted, camera 406C and headset 408C have both been rotated to the left. However, headset 408C has been rotated significantly faster than camera 406C was able to rotate. As in FIG. 4C, view 402D within captured image 400D may be shifted. However, as depicted, view 402D extends beyond captured image 400D. In this instance, the portion of view 402D extending beyond captured image 400D may be displayed as a default image. For example, a portion of the view may be displayed as black until the camera catches up and points in the same direction as the headset.

FIG. 5A depicts a similar situation as FIG. 4A; however, the view of headset 508A is the same as captured image 500A. In some embodiments, the entirety of captured image 500A of object 504A may be captured by camera 506A and transmitted to headset 508A. As depicted, headset 508A and camera 506A are both facing straight ahead. In some embodiments, movement of headset 508A may cause a corresponding movement in camera 506A. For example, moving the headset to look up may cause the camera to also face up, allowing a user wearing the headset to freely move around and view as if they were located where the camera is located, allowing for the remote operation of tools.

FIG. 5B depicts captured image 500B of object 504B as captured by camera 506B and displayed in headset 508B. As depicted, camera 506B and headset 508B have both been slightly rotated left. In some embodiments, this may occur when a user wearing headset 508B turns to the left. If camera 506B is able to rotate or move at the same speed as headset 508B, captured image 500B will be displayed at headset 508B just as if the user wearing headset 508B was located at the same location as camera 506B.

FIG. 5C depicts captured image 500C of object 504C as captured by camera 506C and displayed in headset 508C. As depicted, headset 508C has been rotated at a speed exceeding the rotation speed of camera 506C. In some embodiments, a portion of captured image 500C may be blacked out to indicate that the area is not visible because camera 506C is still moving to match headset 508C. In further embodiments, a portion of captured image 500C may be replaced with a default image or other indication that the portion exceeds what is currently captured by camera 506C. Replacing a portion of captured image 500C when there is a camera latency between the camera 506C movement and the headset 508C movement provides a better user experience as it is more natural for the user than having a visual delay.

Hybrid Rendering

Along with the software latency discussed above, mechanical latency exists between the movement of head-mounted display 126 and the corresponding movement of cameras 112. For example, the user may quickly rotate their head, and the rate at which the user accelerates their head/head-mounted display 126 may be higher than the acceleration of remote assembly 100 that moves cameras 112 to a position corresponding to the new position of head-mounted display 126. Thus, as cameras 112 rotate to match the position of the operator, the view that the user expects cameras 112 to capture and be displayed in head-mounted display 126 does not align with the images being captured by cameras 112 are actually capturing because of the differences in the accelerations of the user's head and cameras 112 when the user rapidly rotates their head. This disconnect between the user and the remote assembly 100 may lead to jittering, disorientation, and other adverse visual effects in the imagery displayed in head-mounted display 126. Techniques for mitigating and/or obviating the mechanical latency such that the operator may not realize that the mechanical latency is present are discussed further hereinafter. In some embodiments, the systems, media, and method described herein include a render cycle that mitigates the mechanical latency that may be present responsive to a rapid rotational acceleration of the head-mounted display that may exceed the rotational acceleration of remote assembly 100. In some embodiments, the render cycle comprises determining a rotation matrix based on the pose of the head-mounted display and an estimated pose of the image. Asynchronously from the render cycle, new images from the cameras 112 may be received, along with new poses of the remote assembly 100 or robot controlling the movement of cameras 112 as the remote assembly 100 or robot moves. An exemplary robot unit is discussed further below with respect to FIGS. 8-10.

Turning now to FIG. 6A, a method 600 for capturing imagery at a remote location and rendering the imagery on a head-mounted display is depicted for some embodiments of the present disclosure. Method 600 may begin at step 602, where an image is received. As previously discussed, the image may be captured by a camera in a remote location and transmitted to a head-mounted device for viewing by a user. The image may be transmitted in a RAW image format.

At step 604, the image may be transmitted to a graphics processing unit for processing. Performing all of the image processing on a GPU may reduce software-related latency, as discussed above with respect to FIG. 3. At step 606, the image may be demosaiced by the GPU. Step 606 may correspond to step 302 discussed above.

Thereafter, at step 608, the image may be converted from a fisheye image to an equirectangular image. Step 608 may correspond to step 304, previously discussed.

Next, at step 610, a rotation matrix (also referred to herein as a hybrid matrix), $$R_{hybird} = R_{Image}^T * R_{HMD},$$

may be determined, where $$R^T_{image}$$

is the transpose of the pose of the image (i.e., the pose of the robot when the image was captured), and $R_{HMD}$ is the pose of the head-mounted display. The pose of the image and the pose of the head-mounted display 126 may be in the coordinate frame of the remote assembly 100. In some embodiments, the image pose is the robot pose adjusted by a predetermined amount based on where the cameras 112 are in relation to the robot. The image pose may be estimated via an extrapolation or an interpolation of two or more robot poses. A buffer (e.g., first in, first out) of poses for the image, the robot, the head-mounted display, or any combination thereof may be stored. By storing the robot poses in a buffer, the pose of the robot at the time the image was captured may be determined to determine the image pose. In some embodiments, the poses and/or sensor data may be filtered. For example, a low pass filter may be used to reduce noise in the received sensor data. Filtering the data may be advantageous when unintended induced vibrations are introduced. For example, if the user operating head-mounted display 126 is tapping their leg or drumming their fingers, the generated vibrations may introduced noise into the sensor data that may be removed or mitigated using a filter. In some embodiments, filtering of sensor data is dynamic. For example, filtering may be used responsive to a detection of unintended vibrations and disabled when the unintended vibrations cease. In some embodiments, filtering is not employed.

In some embodiments, the image pose is determined by extrapolating based on the two most recent robot poses. Extrapolation may be used when a new image has been received and needs to be rendered before a new robot pose has been received. For example, where a new image is received at a time T1, and the render cycle (discussed further below) executes again before a new robot pose is received, extrapolation of previous robot poses may be used to determine the image pose at the time T1. In some embodiments, the previous two robot poses are used, and the image pose is a linear extrapolation based on the two robot poses. Other extrapolation techniques (linear or nonlinear) and/or more than two prior robot poses may be used without departing from the scope hereof.

In some embodiments, the image pose is determined by interpolating between the two most recent robot poses in the buffer where an image was received between the two robot poses, and then the render cycle runs again. For example, a first robot pose may be received at a time T1, the image may be received at a time T2, and a second robot pose may be received at a time T3, where T2 is later in time than T2 and T3 is later in time than T1 and T2. Accordingly, a linear interpolation between the first robot pose preceding the time of the image capture and the second robot pose succeeding the time of the image capture may be used to estimate the pose of the robot when the image was taken (i.e., the image pose). It will be appreciated that non-linear interpolation and/or extrapolation methods may also be used. In some embodiments, three, four, or more samples may be used for the estimation. Non-linear estimations may be useful when the timestamps between received data points increases. For example, rather than being located in a utility vehicle at the worksite and operating remote assembly 100, the operator may work out of an office that is remotely located form the worksite. Accordingly, additional latency is introduced in communicating between the operator and the remote assembly 100. As such, extrapolating based on multiple samples (e.g., three, four, or more) may increase the accuracy of the system and reduce adverse visual effects. Thus, the predictions on where the operator is about to move head-mounted display 126 may be more accurate, and remote assembly 100 can be adjusted accordingly to capture the view that the operator expects to see. In some embodiments, if a robot pose and a new image are received at the same time, the robot pose at that time may be used without performing extrapolation or interpolation.

Lastly, at step 612, the image may be rendered in the head-mounted display 126 based on the rotation matrix determined at step 610. As discussed previously, the image may be an equirectangular image, which may be spherically mapped to the head-mounted display. Rendering images in head-mounted display 126 based on the hybrid matrix may allow for head-mounted display 126 to be used independently of remote assembly 100 without incurring adverse visual effects. For example, the user may lock the movement of remote assembly 100 and move head-mounted display 126 to look around the scene. Areas where no image data is available may be shown as a predefined view (e.g., a black area of view 402A). In some such embodiments, the hybrid matrix is a function of solely the pose of head-mounted display 126 because the image pose remains static. Thus, by using the hybrid rendering, a smooth rendering may be obtained that mitigates issues such as nausea and motion sickness due to quick rotations of head-mounted display 126. Furthermore, the hybrid rendering may allow for a new view to be presented to the operator before a new image has been received and rendered. Because the view may shift around the user based on the rotation matrix, the operator may be presented with an updated view that reflects a new head position without a new image being received and rendered, which may further alleviate issues with adverse visual effects. For example, if the operator moves their head to look upwards, the spherical rendering of the image may be rotated downwards to present the operator a view of the image as if the cameras had moved upwards at the same rate as the operator moved head-mounted display 126.

Turning now to FIG. 6B, a method 650 depicting steps of a render cycle is depicted for some embodiments of the present disclosure. At step 652, a new image may be received. Step 652 may correspond to step 602 discussed above. At step 654, a robot pose may be received. Steps 652 and 654 may occur asynchronously to a render cycle 656 for rendering imagery in head-mounted display 126.

The render cycle 656 may begin at step 658, where a head-mounted display pose for the head-mounted display 126 may be received that indicates the current pose of the operator. The head-mounted display pose may be associated with a timestamp indicating the time at which the head-mounted display pose was measured. Thereafter, at step 660, the pose of the robot may be determined at the time the head-mounted display pose was received at step 658. In some embodiments, the robot pose is determined by either extrapolating or interpolating from stored robot poses, as discussed previously. Other estimation techniques may also be used. For example, it is contemplated that the head-mounted display pose(s) may also be used to extrapolate and/or interpolate future poses of the remote assembly 100. By using the head-mounted display pose(s) to predict where the remote assembly 100 needs to move, the mechanical latency between the remote assembly 100 and head-mounted display 126 may be further reduced by reducing the time required for the remote assembly 100 to adjust the acceleration and/or velocity thereof. Thus, for example, the remote assembly 100 can be instructed to begin moving in a direction corresponding to a predicted movement of head-mounted display 126 before head-mounted display 126 makes the movement. Next, at step 662, the rotation matrix may be determined. Step 662 may correspond to step 610 discussed above. Lastly, at step 664, the image may be spherically rendered in the head-mounted display. Step 664 may correspond to step 612 discussed above.

Steps 658-662 may then repeat for each render cycle 656 of the graphics processing unit 140. In contrast, steps 652 and 654 may occur asynchronously from the render cycle of steps 656-662. By ingesting the image and robot pose asynchronously from the render cycle 656, the issues with jittering may be mitigated because the rendering only relies on the headset pose at the current time, which corresponds to the view that the user expects to be shown in the head-mounted display. For example, cameras 112 may have a frame rate of 60 fps, head-mounted display 126 may have a sample rate of 90 fps for the pose thereof, and the robot assembly may have a sample rate of 500 fps for the sensor data used to determine the robot pose. Each image, robot pose, and head-mounted display pose may be timestamped such that the robot poses can be extrapolated or interpolated to determine the pose of the image at the timestamp of the head-mounted display, as discussed previously. It will be appreciated that the above-described steps 604-608 may occur each time an image is received at step 652.

FIGS. 7A-7D illustrate an example hybrid rendering process in accordance with embodiments of the present disclosure. Specifically, FIGS. 7A-7D illustrate how imagery may be rendered in a head-mounted display responsive to rapid movement of the display to account for latency between the head-mounted display and the camera located remotely from the head-mounted display as discussed with respect to methods 600, 650.

Looking first at FIG. 7A, a view 700 as captured by a camera 702 and seen by a user wearing a head-mounted display 704 is illustrated for some embodiments. As shown and discussed above, view 700 may be an electric live line captured by camera 702 on which a user is remotely operating using a remote assembly 100. Further, as discussed with respect to FIGS. 4A-4D and 5A-5C, view 700 may represent a subset of an image captured by camera 702 or may represent the entire image captured by camera 702. Furthermore, view 700 may be spherically rendered onto head-mounted display 704, providing a generally rectangular view. As shown, camera 702 and head-mounted display 704 are aligned such that the view 700 corresponds to what the user would expect to see if the user was in the remote location and looking at view 700. As the head-mounted display 704 is moved, the view 700 may change, as previously discussed.

Looking now at FIG. 7B, the head-mounted display 704 has rotated 90 degrees Counterclockwise from the position shown in FIG. 7A, while camera 702 is in the same position as illustrated in FIG. 7A. For example, camera 702 may be in the same position due to the movement of camera 702 (or the remote assembly 100 as a whole) being locked or due to the acceleration of head-mounted display 704 being faster than camera 702. For example, the robot may be erroneously moved to a position that triggers an interlock that prevents further movement of the robot and, therefore, the cameras. Accordingly, it may be desirable to allow the operator to look around using head-mounted display 126 while the cameras 112 are stationary.

As illustrated, a portion of view 700 is shown as black because there is no image data to render in head-mounted display 704. FIG. 7B, accordingly, illustrates an example scenario in which rapid rotation of head-mounted display 126 may induce adverse visual effects due to the disconnect between what cameras 112 capture and what is rendered in head-mounted display 126 as compared to what the user expects cameras 112 to capture. However, as discussed above, rendering imagery based on the rotation matrix and ingesting new frames and robot poses asynchronously from the render cycle 656 may mitigate adverse visual effects that result from head-mounted display 126 and cameras 112 accelerating at different rates.

Looking now at FIG. 7C, it can be seen that camera 702 has begun to rotate to match the position of head-mounted display 704. As camera 702 rotates, the new imagery may be rendered onto view 700, as discussed with respect to methods 600 and 650. That is, the rotation matrix may be calculated based on the pose of the image and the pose of the head-mounted display 704 during each render cycle 656. As camera 702 continually rotates, the hybrid rendering may continue to render the new imagery in view 700 until the position of camera 702 aligns with the position of head-mounted display 704, as shown in FIG. 7D.

FIGS. 7B-7D also illustrate how the rendering of the image may be performed with minimal or no jittering, swimming, or other visual anomalies. Specifically, illustrated in FIGS. 7B-7D is a point P, which may be a point that the user wearing head-mounted display 704 is looking at as camera 702 rotates from between the positions illustrated in FIGS. 7B-7D. As shown, the location of point P within view 700 does not change as camera 702 rotates. Thus, rather than point P being shifted to the left in the illustrated views as camera 702 rotates counterclockwise, point P is static (assuming the position of head-mounted display 704 does not change as camera 702 rotates), and the hybrid rendering provides for the view 700 to be smoothly rendered without jittering or other adverse effects.

Exemplary Remote Assembly

FIG. 8 depicts an aerial device 800 relating to some embodiments. The aerial device 800 comprises a utility vehicle 812, a boom assembly 814, and a remote assembly system 1000. The boom assembly 814 comprises a boom 818 having a boom proximal end 820 and a boom distal end 822. In some embodiments, the boom 818 is one of a telescoping boom and an articulating boom. The boom assembly 814 may be attached to the utility vehicle 812 at the boom proximal end 820. The remote assembly system 1000 may be secured to the boom distal end 822, such that the remote assembly system 1000 is supported by the boom assembly 814. In some embodiments, and as described in greater detail below, the remote assembly system 1000 may comprise at least a robot unit adapted for performing telecommunications repair, powerline repair, general repair work, or other actions that may be performed by a robot. For example, the robot unit may comprise one or more utility tools for performing actions such as sawing, cutting, screwing, wiring, or other actions associated with repair work. In some embodiments, the boom 818 is used to position the remote assembly system 1000 in a remote location, such as, for example, adjacent to an energized power line.

FIG. 9 depicts a block diagram 900 related to some embodiments. In some embodiments, the remote assembly system 1000 comprises various assemblies, sub-assemblies, parts, or components for capturing sensory information and/or for performing actions, such as repair work in a telecommunication setting. The remote assembly system 1000 may comprise various circuitry, parts, or other components for capturing sensory information, including video, three-dimensional depth information, audio, and other sensory data. Further, the remote assembly system 1000 may comprise a manually controlled or autonomous robot unit that may be positioned at the end of the boom assembly 814 for interacting with a work site to perform one or more tasks. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 1000 and the operator.

As depicted in block diagram 900, a remote assembly 902 comprises at least a remote capture device 910, a computer 960, and a control system 980. In some embodiments, and as described in greater detail herein, the remote capture device 910 may be a device configured and adapted for the capturing of sensory information and may be positioned on a robot unit for the capturing of sensory information that may be utilized by computer 960, to present information to an operator via a control system, among other purposes. FIG. 9 depicts exemplary sensors, cameras, and other apparatuses that may be utilized by remote capture device 910 for the capturing of sensory information. As described in greater detail below, remote capture device 910 may be mounted or positioned on a selectively movable mount or portion of a robot unit. For example, the robot unit may be a robot unit positioned at the end of a boom assembly for aerial application. However, remote capture device 910 may also be used with a robot unit that is not attached to a boom assembly and, for example, may be utilized with a robot unit for ground application or attached to a mechanical arm or an aerial drone. Accordingly, via the robot unit, sensory information may be captured by remote capture device 910.

Through selective inputs, including both manually inputted instructions and/or automated instructions, remote capture device 910 may capture video, still images, three-dimensional depth information, audio, electrical conductivity, and voltage, among other information that may be captured by a sensor or recording device. For example, remote capture device 910 may comprise at least one instance of camera 912 for the capturing of video or still images (collectively, "video"). The at least one instance of camera 912 may be a camera positioned on remote capture device 910 for the capturing of video data within a selected field of view. The resolution of the video captured by camera 912 may vary, but in some embodiments, camera 912 may be a camera configured for capturing in at least 720p resolution but may capture in higher resolutions including but not limited to 1080p, 2K, 4K, or 8K resolution. However, it will be appreciated that the camera 912 may be any currently known or yet-to-be-discovered camera for capturing video. Video captured from camera 912 may be stored locally at remote capture device 910 at a local memory 914. The storing of video at local memory 914 may aid in providing failsafe or backup storage of captured video in the event of a transmission or upload failure. Further, the storing of video at local memory 914 may aid in situations of poor wireless connection or if a direct line becomes loose or interrupted, preventing the immediate transmission of captured video. Optionally or additionally, video captured from camera 912 may be transmitted to computer 960 for processing, analyzing, storage, and/or for later transmission to control system 980. In further embodiments, video captured from camera 912 may be directly transmitted to control system 980 for processing.

In some embodiments, remote capture device 910 may further comprise at least one instance of three-dimensional camera 916 or other device configured for capturing three-dimensional depth information. As described in greater detail below, the three-dimensional camera 916 may be utilized for capturing three-dimensional depth information within a field of view for creating a point cloud, 3-D model, or other digital representation of an object or area scanned or viewed by the three-dimensional camera 916. Three-dimensional camera 916 may be operated in conjunction with, or independent from camera 912 or other components or parts of remote assembly 902 and/or remote capture device 910. As described in greater detail below, in response to instructions or input, three-dimensional camera 916 may begin capturing three-dimensional depth information about an object or area within a field of view. Like the captured video with respect to camera 912, the three-dimensional depth information captured by three-dimensional camera 916 may be saved locally at local memory 914. In some embodiments, remote capture device 910 may comprise an instance of local memory 914 for video captured by camera 912 and a separate instance of local memory 914 for three-dimensional information captured by three-dimensional camera 916. As described in greater detail below, remote capture device 910 may comprise a microphone 918 and/or at least one instance of sensor 920 for capturing additional sensory information. Accordingly, in some embodiments, a separate and distinct instance of local memory 914 may be used for each sensory capture device (i.e., camera 912, three-dimensional camera 916, microphone 918, and/or sensor 920). In further embodiments, remote capture device 910 may comprise a single instance of local memory 914 for the storing of all captured sensory information. As described above and in further embodiments, three-dimensional information may be directly sent to computer 960 in addition to or instead of stored locally at local memory 914.

In addition to capturing video and/or three-dimensional information, it may also be advantageous for remote capture device 910 to capture additional sensory information that may be presented to an operator or processed by computer 960. For example, in certain scenarios, it may be advantageous for remote capture device 910 to capture audio via at least one instance of microphone 918. Continuing with the running example, a remote assembly 902 for use with telecommunications repair may utilize audio information for diagnostic or safety purposes. For example, audio information may capture the sounds of the job site, and the audio information may be processed to determine if a job site is safe. Accordingly, in some embodiments, remote capture device 910 may comprise at least one instance of microphone 918 for the capturing of audio information. Similar to the video and three-dimensional information as described above, captured audio information may be stored locally at local memory 914 and/or transmitted to a computer 960 and/or control system 980.

Similar to audio information, remote capture device 910 may further comprise one or more instances of sensor 920 for the capturing of additional sensory information, metrics, or data. For example, continuing with the running example, the remote capture device 910 may be used with a remote assembly 902 positioned at the end of boom assembly 814 for telecommunication or powerline work. In such a work application, the remote assembly 902 may be working on or near live powerlines or other conductive lines transferring electricity. Accordingly, in some embodiments, remote capture device 910 may comprise at least one instance of sensor 920 configured as an electricity sensor for determining whether a cable or powerline has electricity running through it. However, it will be appreciated that remote capture device 910 may comprise additional instances of sensor 920 configured and adapted for providing remote capture device and/or remote assembly 902 with additional information. By way of non-limiting example, sensor 920 may comprise any of the following sensors: a gyroscope, an accelerometer, a thermometer, a barometer, a light emitter, a voltage meter, a current meter, among other sensors that may be utilized in the intended application of remote assembly 902.

In some embodiments, the remote assembly 902 further comprises at least one instance of digital hub 922. The digital hub 22 may receive the captured sensory information from remote capture device 910 and convert the captured sensory information into a format suitable for transmitting to computer 960 and/or control system 980. In some embodiments, the digital hub 922 is a USB hub, such as, for example, a USB 3.0 hub.

As further depicted in FIG. 9, remote assembly 902 may further comprise a controller 924. In some embodiments, controller 924 may be a processor or other circuitry or computer hardware for receiving commands or instructions from control system 980 and/or computer 960 and for relaying or providing commands to remote capture device 910 and/or motion controls 930. Accordingly, in some embodiments, instructions or commands from controller 924 may be sent to remote capture device 910. For example, instructions sent from controller 924 to remote capture device 910 may include instructions to begin recording video via camera 912. However, it will be appreciated that instructions sent from controller 924 may cause any of the components of remote capture device 910 to begin capturing sensory information, including but not limited to three-dimensional information, audio information, or other sensory information captured by any of the sensors 920 of remote capture device 910. Additionally, controller 924 may be used to send instructions to cause remote assembly 902, remote capture device 910, and/or motion controls 930 to perform other actions corresponding to the instructions. For example, instructions from controller 924 may instruct remote capture device 910 to store captured sensory information on local memory 914. Additionally, instructions from controller 924 may be sent to motion controls 930 to instruct remote assembly 902 to perform a movement. Further, controller 924 may be in communication with transceiver 944 for communicating with computer 960 and/or control system 980 to send sensory information or other data or information to computer 960 and/or control system 980. Similarly, controller 924 may further be configured for receiving instructions, commands, or other information from computer 960 and/or control system 980.

As further depicted in the block diagram of FIG. 9 and in some embodiments, remote assembly 902 may further comprise motion controls 930. Motion controls 930 may be configured and adapted for controlling the movement of remote assembly 902, including any utility arms or camera mounts, as described in greater detail below. In some embodiments, remote assembly 902 may comprise a 6 DOF robot unit configured with utility arms and/or camera mounts that can move with 6 DOF. Accordingly, motion controls 930 may be configured to provide instructions or commands to remote assembly 902 to move in 6 DOF. In some embodiments, motion controls may comprise x-axis control 932, y-axis control 934, z-axis control 936, pitch control 938, yaw control 940, and/or roll control 942 for moving remote assembly 902 with 6 DOF. It will be appreciated, however, that remote assembly 902 may comprise varying designs and, in some embodiments, may move in fewer than 6 DOF. Accordingly, in further embodiments, motion controls 930 may comprise controls configured and adapted for moving remote assembly 902 in an appropriate number of planes.

As described above, motion controls 930 may be in communication with controller 924. Instructions or commands from controller 924 may be sent to motion controls 930. Upon receipt of the instructions, the corresponding controls (x-axis control 932, y-axis control 934, z-axis control 936, pitch control 938, yaw control 940, and/or roll control 942) may be instructed to cause movement of the remote assembly 902 based on the received instructions. As described above, one or more arms or limbs of remote assembly 902 may be configured to move with 6 DOF. Based on the instructions, the motion controls 930 may cause movement of the remote assembly 902 to correspond to the instructions.

As described above, remote assembly 902 may be communicatively coupled to computer 960. In some embodiments, computer 960 may be directly coupled to remote assembly 902, such that computer 960 and remote assembly 902 are a combined system. For example, computer 960 may be directly installed into a frame or body of remote assembly 902. Accordingly, remote assembly 902 and computer 960 may be in direct communication through cables or other direct methods. In further embodiments, computer 960 may be located external to remote assembly 902. When located externally, remote assembly 902 and computer 960 may nevertheless be communicatively coupled. For example, in some embodiments, remote assembly 902 and computer 960 may be coupled through a physical connection such as an Ethernet cable or USB cable. In further embodiments, remote assembly 902 and computer 960 may be coupled through a wireless connection, such as WiFi, Bluetooth®, cellular connection, or another wireless connection. In embodiments in which computer 960 and remote assembly 902 are connected through a wireless connection, transceiver 944 may communicate with another transceiver 950 coupled or otherwise in communication with computer 960.

In some embodiments, computer 960 may receive and process sensory information captured by remote capture device 910 of remote assembly 902. Accordingly, computer 960 may comprise at least a processor 962 for executing commands, which may include instructions for processing, analyzing, or utilizing captured sensory information. For example, as described in greater detail below, computer 960 may utilize captured three-dimensional information to generate a point-cloud, three-dimensional model, or other digital representation of an object or area captured by remote capture device 910.

In some embodiments, control system 980 may be an interface, apparatus, or system providing a user with an interactive medium for interacting with computer 960 and/or remote assembly 902. For example, in some embodiments, control system 980 may comprise at least a processor 982, at least one instance of controller 984, at least one instance of display 988, at least one instance of sensor 990, and at least one instance of transceiver 992. As described in greater detail below, some embodiments of the present teachings provide for a method of controlling remote assembly 902 from a remote location. Continuing with the running example, oftentimes telecommunications repair or power-line repair sometimes occurs during or immediately after a severe weather storm. This type of scenario can be wrought with dangers such as exposed and live powerlines, high winds, lightning, and other dangers that pose a risk to human workers. Accordingly, it may be advantageous for an operator of remote assembly 902 to control remote assembly 902 in a safe location, such as in a work truck or building away from the job site. Accordingly, control system 980 may comprise at least one instance of controller 984, providing an interactive means for a user to input commands or instructions for controlling or manipulating remote assembly 902. Controller 984 may be any interface for inputting commands or instructions that can be transmitted and processed by a computer or other hardware. By way of non-limiting example, controller 984 may comprise hand-held motion control controllers. As described in greater detail below, the motion-control controllers may be beneficial for an operator to perform specific movements or actions that can be captured and relayed to remote assembly 902 to perform. Through the use of motion-control controllers, an operator may be provided with a sensory effect similar to being at the job site and performing the actions themselves. However, controller 984 is not limited to motion controls and, instead, controller 984 may be any interface for an operator to input instructions or commands for remote assembly 902. For example, in further embodiments, controller 984 may be a handheld controller, similar to that of a video game controller comprising thumbsticks, buttons, triggers, and/or other interfacing inputs. In further embodiments, controller 984 may comprise a joystick and button design. In even further embodiments, controller 984 may be a mouse and keyboard. In even further embodiments, controller 984 may be configured as a glove or interactive model of a hand, allowing an operator to perform native hand manipulations, which may be captured and transmitted to remote assembly 902. In even further embodiments, controller 984 may comprise a camera component or other motion capture component for capturing the movement of an operator. For example, in addition to, or in place of a physical controller handled by the operator, a camera component may capture the movement of the operator. The captured movement may be transmitted to computer 960 for translation or mapping movement of remote assembly 902. Optionally, or additionally, motion capture aids, such as motion capture dots, may also be used for capturing movements of the operator. It will be appreciated that the examples provided herein are intended to be illustrative rather than limiting and that controller 984 may be any apparatus or method of receiving instructions or input from an operator.

In some embodiments, control system 980 may further comprise a power medium 986 for powering one or more parts or components of control system 980, including, for example, controller 984, display 988, or the at least one instance of sensor 990, or any combination thereof. In some embodiments, a single instance of power medium 986 may power all parts or components of control system 980. In further embodiments, individual parts or components of control system 980 may comprise separate and distinct instances of power medium 986. For example, a first instance of power medium 986 may be used for powering controller 984, and a second instance of power medium 986 may be used for powering display 988. Power medium 986 may be any conventionally known power source for providing power to an electrical device, including but not limited to an internal power source such as a battery or an external battery source such as an electrical outlet.

As further depicted in FIG. 9, control system 980 may further comprise at least one instance of display 988. In some embodiments, display 988 may be a monitor, touch-screen, television screen, or other display. In some embodiments, at least a portion of the captured sensory information from remote capture device 910 may be displayed on display 988 for an operator to view. For example, captured video may be displayed on display 988. Providing sensory information on display 988 may provide an operator with a more immersive feel when remotely operating remote assembly 902. Through a real-time video feed, an operator may experience the job site as if the operator was physically present, even if the operator is in a safe location miles away. Additionally, providing sensory information to an operator via display 988 may aid the operator in inputting instructions or commands via controller 984.

In some embodiments, control system 980 may further comprise at least one instance of sensor 990, which may provide additional sensory effects to the operator and/or capture additional inputs that may be used by computer 960 to provide instructions to remote assembly system 1000. In some embodiments, one or more sensors may be combined with controller 984, and/or one or more sensors may be combined with display 988. For example, in some embodiments, sensor 990 may be at least one speaker or sound-emitting device to provide the operator with audio information captured from remote capture device 910 or pre-recorded or pre-rendered audio. In further embodiments, the at least one instance of sensor 990 may be one of an accelerometer, a gyroscope, a light sensor, or any other type of sensor 990 suitable to detect the viewing angle of the user or the movement, position, or angle of the operator's body.

In some embodiments, and as described in greater detail below, an operator may utilize controller 984, display 988, and the at least one instance of sensor 990 to provide instructions to remote assembly 902, which may be analyzed and translated into instructions to cause remote assembly 902 to move or perform an action. As also described in greater detail below, an operator may input instructions or commands through control system 980. In some embodiments, inputs may be inputted or captured by a combination of controller 984 and display 988. For example, display 988 may be coupled to a head-mounted unit, as described in greater detail below. An operator may move their head or torso, with sensor 990 capturing the movement and/or viewing angle of the operator. The captured movement data or viewing angle may be sent to computer 960 via transceiver 992, and computer 960 may take the captured movement data or viewing angle and translate it into instructions for causing remote assembly 902 to move and mimic or replicate the operator's movement and match the viewing angle of the operator.

FIG. 10 is an exemplary embodiment of a remote assembly system 1000. In some embodiments, the remote assembly system 1000 may comprise various assemblies, sub-assemblies, parts, or components, including but not limited to a robot unit 1002 affixed at the end of a boom assembly 814. Further, the remote assembly system 1000 may correspond to the remote assembly 902 as described above with respect to FIG. 9 and may comprise any and all of the components or parts as described above. In some embodiments, robot unit 1002 may be configured and adapted to receive instructions from a computer or operator to perform a corresponding movement or action. In some embodiments, robot unit 1002 may be a fully manually controlled robot, wherein the robot unit 1002 will not perform a movement or action absent an instruction provided by an operator. In further embodiments, robot unit 1002 may be fully a fully automated robot, wherein robot unit 1002 performs actions or movements based on pre-programmed instructions for automation. In even further embodiments, robot unit 1002 may be a robot configured to respond to both manually inputted instructions and automated programming. Accordingly, the various movements or actions performed by robot unit 1002 and described herein may be performed based on manually provided instructions and/or automated programming.

As described above and as illustrated in FIG. 10, in some embodiments, remote assembly system 1000 may be positioned at the boom distal end 822 of boom assembly 814. As depicted, in some embodiments, boom distal end 822 of boom assembly 814 may comprise a pivot joint 830 comprising a motor 832. In some embodiments, pivot joint 830 may be used to change an angle or position of remote assembly system 1000. In further embodiments, pivot joint 830 may be paired with a sensor, such as a gyroscope, to aid in maintaining a leveled position of remote assembly system 1000. As further depicted in FIG. 10, pivot joint 830 may further act as an attachment point between remote assembly system 1000 and boom assembly 814. For example, a base 850 may be coupled to pivot joint 830. Base 850 may be adapted and configured for receiving and coupling remote assembly system 1000. Accordingly, through such coupling, remote assembly system 1000 may be secured and attached to boom assembly 814. In some embodiments, base 850 may comprise a generally planar design for accepting and securing one or more assemblies, sub-assemblies, parts, or components of remote assembly system 1000. Further, the size and shape of base 850 may vary and may be dependent on the design of remote assembly system 1000. Further, in some embodiments, base 850 may further comprise a motorized turntable 852. Motorized turntable 852 may be a power motor train system for the rotation of base 850. The rotation of base 850 may be advantageous for positioning remote assembly system 1000 during use.

In some embodiments, remote assembly system 1000 may generally comprise a robot unit 1002. Robot unit 1002 may be a controllable robotics unit that can perform a range of movements and actions, such as performing repair work in a telecommunication setting. In some embodiments, and as described in greater detail below, robot unit 1002 may be a 6 DOF robotics assembly configured and adapted for mimicking the movement of an operator utilizing a VR controller. Particularly, through a 6-DOF configuration, robot unit 1002 may substantially mimic the torso, neck, and arm movements of the operator. Through such movement, robot unit 1002 may perform a greater range of movements and/or provide a more immersive experience to an operator than pre-existing systems.

In some embodiments, robot unit 1002 may comprise a central hub 1004. Central hub 1004 may be a central housing or base, which may house a processor, a power source, circuitry, a wireless communication means, and/or other electronics for robot unit 1002, including the components described above with respect to FIG. 9. Additionally, central hub 1004 may act as a coupling or attachment member, securing robot unit 1002 to base 850. Even further, central hub 1004 may also act as a receiving point for one or more parts or components of robot unit 1002. For example, and as described below, robot unit 1002 may comprise at least one utility arm and at least one camera mount. Accordingly, central hub 1004 may receive and couple with the at least one utility arm and the at least one camera arm.

To collect sensory information, including but not limited to video and three-dimensional depth information, robot unit 1002 may comprise at least one instance of camera mount 1010. Camera mount 1010 may be a 6 DOF, selectively controllable, robotic arm that may couple to central hub 1004. As described above, robot unit 1002 may receive movement instructions or commands from computer 960 that may cause camera mount 1010 to move or change position. For example, camera mount 1010 may correspond to a head mount or other capture apparatus to capture the viewing angle of an operator. Instructions or commands may be relayed to robot unit 1002, causing camera mount 1010 to move in a corresponding manner to match the viewing angle of the operator. To enhance the operator experience, camera mount 1010 may comprise a plurality of camera mount segments 1012 that may be separated by pivotable joints 1014, which may be motorized or otherwise actuated. The number and size of camera mount segments and pivotable joints 1014 may vary depending on the embodiments and application of robot unit 1002. Generally, in response to an instruction or command, one or more of the pivotable joints 1014 may activate to rotate or move camera mount 1010. In some embodiments, the pivotable joints 1014 may be used to move camera mount 1010 in the X-axis, Y-axis, and/or Z-axis, as well as control the roll, pitch, and/or yaw of the camera mount 1010. Accordingly, through movement in the 6 DOF, camera mount 1010 may mimic or replicate the viewing angle of the operator. As further depicted in FIG. 10, a distal end of camera mount 1010 may further comprise a sensory capture device. In some embodiments, the sensory capture device generally comprises at least one camera, three-dimensional camera, and/or sensor for capturing sensory information.

As described above, robot unit 1002 may be adapted for performing repair work, maintenance work, or other similar tasks or actions. To perform these actions, robot unit 1002 may comprise at least one utility arm. The embodiment illustrated in FIG. 10 depicts an exemplary embodiment of robot unit 1002 comprising two utility arms, utility arm 1030*a* and utility arm 1030*b*. Like camera mount 1010 (as described above), each of utility arm 1030*a* and utility arm 1030*b* may comprise a plurality of utility arm segments 1032 that may be separated by pivotable joints 1034, which may be motorized or otherwise actuated. The number and size of the plurality of utility arm segments 1032 and pivotable joints 1034 may vary on the embodiments and application of robot unit 1002. Generally, in response to an instruction or command, one or more of the pivotable joints 1034 may activate to rotate or move utility arms 1030*a*, 1030*b*. In some embodiments, the pivotable joints 1034 may be used to move utility arm 1030*a* and utility arm 1030*b* in the X-axis, Y-axis, and/or Z-axis, as well as control the roll, pitch, and/or yaw of the camera mount 1010. Accordingly, through movement in the 6 DOF, each utility arm 1030*a*, 030*b* may mimic or replicate the movement of an operator's arms and hands. In some embodiments, the distal ends 1036 of utility arm 1030*a* and utility arm 1030*b* may comprise one or more tools, flanges, or other apparatus for performing an action such as repair work. In some embodiments, distal ends 1036 may comprise an adapter or may be otherwise configured for accepting a tool.

Remote assembly system 1000 may further comprise a remote power source 1050. In some embodiments, the remote power source 1050 may be secured to the base 850. In further embodiments, remote power source 1050 may be located within central hub 1004. The remote power source 1050 may be used to provide power to camera mount 1010, utility arm 1030*a*, utility arm 1030*b*, or any combination thereof. Remote power source 1050 may be an electric generator, batteries, or any other known power source.

In further embodiments, robot unit 1002 may comprise one or more additional capture devices or sensors 1060 for capturing additional information that may be analyzed and/ or presented to a user or operator. For example, in some embodiments, robot unit 1002 may comprise a thermometer or heat sensor for capturing heat information. In some embodiments, robot unit 1002 may comprise an electrical sensor for capturing electrical data. For example, robot unit 1002 may be used to work on power lines or in other scenarios involving live power lines or other electrically charged wires or circuitry. Accordingly, to avoid damage to the robot unit 1002, the boom assembly 814, or the utility vehicle 812, at least one instance of sensor 1060 may be a sensor for detecting an electrical current. Additionally, robot unit 1002 may comprise at least one instance of sensor 1060 that is at least one of an accelerometer, gyroscope, light sensor, or other sensor for detecting the positioning of camera mount 1010, utility arm 1030*a*, and/or utility arm 1030*b*. In some embodiments, a sensor for detecting the positioning of robot unit 1002 may aid in replicating or mimicking the movement of an operator using motion controls.

In some embodiments, and as depicted in FIG. 10, in addition to robot unit 1002, boom assembly and remote assembly system 1000 may further comprise at least one instance of utility arm 1090 or additional robotics assembly that may operate separately or in conjunction with robot unit 1002. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require robotics configured for transporting heavy loads. However, once in position, the part may need robotics configured for delicate or sophisticated operations to install the part in position. Embodiments of the present disclosure solve this dilemma by pairing a robotic assembly configured and adapted for fine-tuning and/or delicate work with robotics configured and adapted for load bearing or transporting heavy loads. For example, in some embodiments, robot unit 1002 may be configured and adapted for performing movements or actions directed to sophisticated, delicate, or fine-tuning work, such as unthreading wire, cutting wire, or loosening screws and bolts. In some embodiments, remote assembly system 1000 may comprise at least one instance of utility arm 1090 for holding or transporting heavy loads that may be too heavy for robot unit 1002 to safely hold and transport. Accordingly, through the combination of robot unit 1002 and utility arm 1090, remote assembly system 1000 may perform both dexterous actions and load-bearing actions.

Exemplary Hardware Platform

In FIG. 11, an exemplary hardware platform for certain embodiments is depicted. Computer 1102 can be a desktop computer, a laptop computer, a server computer, a mobile device such as a smartphone or tablet, or any other form factor of general- or special-purpose computing device.

Depicted with computer 1102 are several components for illustrative purposes. In some embodiments, certain components may be arranged differently or absent. Additional components may also be present. Included in computer 1102 is system bus 1104, whereby other components of computer 1102 can communicate with each other. In certain embodiments, there may be multiple buses or components may communicate with each other directly. Connected to system bus 1104 is central processing unit (CPU) 1106. Also attached to system bus 1104 are one or more random-access memory (RAM) modules 1108. Also attached to system bus 1104 is graphics card 1110. In some embodiments, graphics card 1110 may not be a physically separate card but rather may be integrated into the motherboard or the CPU 1106. In some embodiments, graphics card 1110 has a separate graphics-processing unit (GPU) 1112, which can be used for graphics processing or for general-purpose computing (GPGPU). Also on graphics card 1110 is GPU memory 1114. Connected (directly or indirectly) to graphics card 1110 is display 1116 for user interaction. In some embodiments, no display is present, while in others, it is integrated into computer 1102. Similarly, peripherals such as keyboard 1118 and mouse 1120 are connected to system bus 1104. Like display 1116, these peripherals may be integrated into computer 1102 or absent. Also connected to system bus 1104 is local storage 1122, which may be any form of computer-readable media and may be internally installed in computer 1102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical but transitory forms of signal transmission such as radio broadcasts, electrical signals through a wire, or light pulses through the fiber-optic cable 124. Examples of stored information include computer-usable instructions, data structures, program modules, and other data representations.

Finally, network interface card (NIC) 1124 is also attached to system bus 1104 and allows computer 1102 to communicate over a network such as local network 1126. NIC 1124 can be any form of network interface known in the art, such as Ethernet, ATM, fiber, Bluetooth, or Wi-Fi (i.e., the IEEE 1102.11 family of standards). NIC 1124 connects computer 1102 to local network 1126, which may also include one or more other computers, such as computer 1128, and network storage, such as data store 1130. Generally, a data store such as data store 1130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer such as computer 1128, accessible on a local network such as local network 1126, or remotely accessible over Internet 1132. Local network 1126 is, in turn, connected to Internet 1132, which connects many networks such as local network 1126, remote network 1134, or directly attached computers such as computer 1136. In some embodiments, computer 1102 can itself be directly connected to Internet 1132.

It should be understood that, in some embodiments, computer 1102 may be the central computer 142 described in reference to FIG. 1 and may perform similar operations. In some embodiments, computer 1102 may be associated with a utility vehicle. Similarly, the CPU 1106 may be central processing unit 138 described above. Further, the GPU 1112 may be graphics processing unit 140 described above. Additionally, instructions to perform any of the steps described in reference to FIGS. 2 and 3 may be stored on the local storage 1122. The graphics processing unit 140 and/or GPU 1112 may execute computer-executable instructions that may be stored on non-transitory computer-readable media.

In some embodiments, any other display may be used to perform any operation described herein with respect to the head-mounted display, such as display 1116. In such embodiments, the display may be presented to the user by any suitable means. For example, the display may be a computer monitor, a television screen, a mobile phone display, etc. Further, in some embodiments, a plurality of displays may be used selected from any combination of the types of displays described herein, such as, for example, a computer screen and the head-mounted display 126. In some embodiments, a plurality of head-mounted displays may be used, with each of the head-mounted displays receiving independent sensory information, which can be worn by multiple users.

The following U.S. patent applications, each filed Jul. 28, 2022, are each hereby incorporated by reference in their entirety as if set forth herein verbatim: U.S. application Ser. No. 17/875,674 titled "MANUAL OPERATION OF A REMOTE ROBOT ASSEMBLY"; U.S. Pat. No. 11,660,750, titled "AUTONOMOUS AND SEMI-AUTONOMOUS CONTROL OF AERIAL ROBOTIC SYSTEMS"; U.S. application Ser. No. 17/875,743, titled "COOPERATIVE HIGH-CAPACITY AND HIGH-DEXTERITY MANIPULATORS"; U.S. application Ser. No. 17/875,796 titled "ROTARY TOOL FOR REMOTE POWER LINE OPERATIONS"; U.S. application Ser. No. 17/875,821, titled "OPERATION AND INSULATION TECHNIQUES"; U.S. Pat. No. 11,697,209, titled "COORDINATE MAPPING FOR MOTION CONTROL"; U.S. Pat. No. 11,689,008, titled "WIRE TENSIONING SYSTEM"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET." The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the presently disclosed subject matter has been described with reference to the embodiments illustrated in the attached drawing figures, it is noted that equivalents may be employed and substitutions made herein without departing from the scope of the invention defined by the appended claims.

Accordingly, what is claimed as new and desired to be protected by Letters Patent includes the following:

1. One or more non-transitory computer-readable media storing computer-executable instructions that, when executed by at least one processor, perform a method for reducing latency for imagery captured in a remote location and displayed in a head-mounted display, the method comprising:

receiving, from a remote capture device controlled by a robot assembly located in the remote location, an image of the remote location;

receiving a head-mounted display pose of the head-mounted display;

transmitting, by the remote capture device, the image to a graphics processing unit associated with the head-mounted display; and causing the graphics processing unit to execute instructions for:

determining, by the graphics processing unit, a rotation difference based on an image pose of the image and the head-mounted display pose;

spherically rendering, by the graphics processing unit, the image on the head-mounted display based on the rotation difference;

responsive to a first movement of the head-mounted display, determining, by the graphics processing unit, a new head-mounted display pose, wherein the first movement of the head-mounted display occurs while the remote capture device is locked from moving;

determining, by the graphics processing unit, a new rotation difference;

rendering, by the graphics processing unit, a new image based on the new rotation difference;

extrapolating, by the graphics processing unit, at least one future movement of the head-mounted display; and instructing the robot assembly associated with the remote capture device to initiate a new movement corresponding to the at least one future movement.

2. The one or more non-transitory computer-readable media of claim 1, wherein the image pose is determined using at least one of non-linear extrapolation or non-linear interpolation of two or more image poses.

3. The one or more non-transitory computer-readable media of claim 1, wherein the method further comprises:

responsive to a second movement of the head-mounted display, causing a corresponding movement of the remote capture device by the robot assembly.

4. The one or more non-transitory computer-readable media of claim 1, wherein the method further comprises:

communicating over a dielectric gap, via a fiber optic cable disposed between the remote capture device and the head-mounted display, additional sensor data captured by at least one of:

a gyroscope, an accelerometer, a thermometer, a barometer, a light emitter, a voltage meter, or a current meter.

5. The one or more non-transitory computer-readable media of claim 1, further comprising causing the graphics processing unit to execute further instructions for:

demosaicing, by the graphics processing unit, the image; and converting, by the graphics processing unit, the image from a fisheye image to an equirectangular image, wherein the image is spherically rendered from the equirectangular image.

6. The one or more non-transitory computer-readable media of claim 1, wherein the remote capture device is coupled to an aerial device located on a utility vehicle.

7. The one or more non-transitory computer-readable media of claim 1, wherein the image and the head-mounted display pose are received asynchronously.

8. A system for viewing a remote location, comprising:

a remote capture device configured to capture video of the remote location;

a robot assembly coupled to the remote capture device;

a head-mounted display configured to control movement of the remote capture device; and a graphics processing unit associated with the head-mounted display and configured to execute computer-executable instructions comprising:

receiving, by the graphics processing unit, a frame of the video from the remote capture device;

determining, by the graphics processing unit, an image pose by extrapolating from two or more robot poses associated with the robot assembly;

determining, by the graphics processing unit, a rotation difference using the image pose and a head-mounted display pose; spherically rendering, by the graphics processing unit, the frame of the video on the head-mounted display based on the rotation difference; and responsive to detecting a vibration at the head-mounted display, mitigating the vibration using a filter.

9. The system of claim 8, wherein the head-mounted display comprises:

a plurality of visual displays configured to display a stereoscopic virtual representation of the remote location.

10. The system of claim 8, wherein the graphics processing unit is configured to execute additional computer-executable instructions comprising:

responsive to receiving the frame from the remote capture device, demosaicing, by the graphics processing unit, the frame; and converting, by the graphics processing unit, the frame from a fisheye image frame to an equirectangular image frame, wherein the frame is spherically rendered from the equirectangular image frame.

11. The system of claim 8, wherein the computer-executable instructions further comprise:

responsive to a new movement of the head-mounted display, determining, by the graphics processing unit, a new head-mounted display pose, wherein the new movement of the head-mounted display occurs while the robot assembly is locked from moving;

determining, by the graphics processing unit, a new rotation difference; and rendering, by the graphics processing unit, a new image based on the new rotation difference.

12. The system of claim 8, wherein the remote capture device further comprises a microphone configure to capture audio at the remote location.

13. The system of claim 8, wherein the filter used to mitigate the vibration is a low-pass filter.

14. The system of claim 8, wherein the computer-executable instructions further comprise:

responsive to the vibration at the head-mounted display ceasing to be detected, disabling the filter used to mitigate the vibration.

15. A method for rendering imagery of a remote location, the method comprising:

receiving an image from a remote capture device coupled to a robot assembly disposed in the remote location;

determining an image pose by interpolating from two or more robot poses associated with the robot assembly;

wherein the image pose is determined using interpolation based on a first robot pose and a second robot pose from the two or more robot poses, the first robot pose preceding a time at which the image was captured and the second robot pose succeeding the time at which the image was captured;

determining, by a graphics processing unit and based on the image pose and a head-mounted display pose of a head-mounted display, a rotation difference;

determining, by the graphics processing unit, the first robot pose based on a plurality of prior robot poses; and rendering, by the graphics processing unit and based on the rotation difference, the image in the head-mounted display.

16. The method of claim 15, further comprising:

receiving, by the graphics processing unit, the image between a first time associated with the first robot pose and a second time associated with the second robot pose; and buffering, by the graphics processing unit, the first robot pose and the second robot pose.

17. The method of claim 15, further comprising:

responsive to a movement of the head-mounted display, determining, by the graphics processing unit, a new head-mounted display pose, wherein the movement of the head-mounted display occurs while the robot assembly is locked from moving;

determining, by the graphics processing unit, a new rotation difference; and rendering, by the graphics processing unit, a new image based on the new rotation difference.

18. The method of claim 15, further comprising:

responsive to receiving the image, demosaicing, by the graphics processing unit, the image; and converting the image from a fisheye image to an equirectangular image, wherein the image is rendered from the equirectangular image.

19. The method of claim 15, wherein the rotation difference is represented by a rotation matrix.

20. The method of claim 15, further comprising:

responsive to receiving the image, overlaying the image with a color filter array such that a color image is obtained that matches a color captured by the remote capture device.

* * * * *